United States Patent
Saito et al.

(10) Patent No.: US 7,433,510 B2
(45) Date of Patent: Oct. 7, 2008

(54) INFORMATION PRESENTATION APPARATUS AND INFORMATION PRESENTATION SYSTEM USING THE SAME

(75) Inventors: Akito Saito, Hino (JP); Takao Shibasaki, Tokyo (JP); Kazuhiko Takahashi, Hachioji (JP); Takemasa Sugita, Sagamihara (JP)

(73) Assignee: Olympus Corporation, Tokyo (JP)

( * ) Notice: Subject to any disclaimer, the term of this patent is extended or adjusted under 35 U.S.C. 154(b) by 482 days.

(21) Appl. No.: 11/327,776

(22) Filed: Jan. 6, 2006

(65) Prior Publication Data

US 2006/0111797 A1    May 25, 2006

Related U.S. Application Data

(63) Continuation of application No. PCT/JP2004/009786, filed on Jul. 2, 2004.

(30) Foreign Application Priority Data

| Jul. 11, 2003 | (JP) | ............... 2003-273565 |
| Jul. 11, 2003 | (JP) | ............... 2003-273566 |
| Oct. 15, 2003 | (JP) | ............... 2003-355462 |
| Nov. 28, 2003 | (JP) | ............... 2003-400768 |

(51) Int. Cl.
*G06K 9/00* (2006.01)

(52) U.S. Cl. .............. 382/154; 345/419; 345/441; 382/141; 382/218; 382/291; 700/59

(58) Field of Classification Search .......... 345/419, 345/420, 441, 442; 382/141, 154, 218, 291; 700/59

See application file for complete search history.

(56) References Cited

U.S. PATENT DOCUMENTS

| 6,389,182 | B1 |   | 5/2002  | Ihara et al.  |         |
| 6,577,249 | B1 |   | 6/2003  | Akatsuka et al. |       |
| 6,681,129 | B2 | * | 1/2004  | Matsuzaki et al. | 600/407 |
| 6,721,444 | B1 | * | 4/2004  | Gu et al.     | 382/154 |
| 6,823,080 | B2 | * | 11/2004 | Iijima et al. | 382/154 |
| 6,937,235 | B2 | * | 8/2005  | Fujiwara et al. | 345/420 |

(Continued)

FOREIGN PATENT DOCUMENTS

JP    62-74155    4/1987

(Continued)

*Primary Examiner*—Gregory M Desire
(74) *Attorney, Agent, or Firm*—Scully, Scott, Murphy & Presser, P.C.

(57) ABSTRACT

A three-dimensional position posture relation detection unit detects a relation of relative three-dimensional position and posture between an image input unit and a target object using the image of the target object in a real space input from the image input unit. A difference comparison detection unit compares the detected position and posture of the target object and a value stored in a figuration information storage unit corresponding to a part of the target object so as to detect a difference between an actual position and posture of the input target object and stored figuration information of the target object. A figuration information management unit reflects a value of the detected difference on figuration information stored in the figuration information storage unit. A superposed image generation unit generates an image which is obtained by superposing the image of the input target object and stored figuration information of the target object.

22 Claims, 17 Drawing Sheets

U.S. PATENT DOCUMENTS

| | | | |
|---|---|---|---|
| 2001/0014171 A1* | 8/2001 | Iijima et al. | 382/154 |
| 2002/0172415 A1* | 11/2002 | Asano et al. | 382/154 |
| 2003/0034971 A1* | 2/2003 | Fujiwara et al. | 345/420 |
| 2006/0111797 A1* | 5/2006 | Saito et al. | 700/59 |

FOREIGN PATENT DOCUMENTS

| | | |
|---|---|---|
| JP | 2002-92044 | 3/2002 |

* cited by examiner

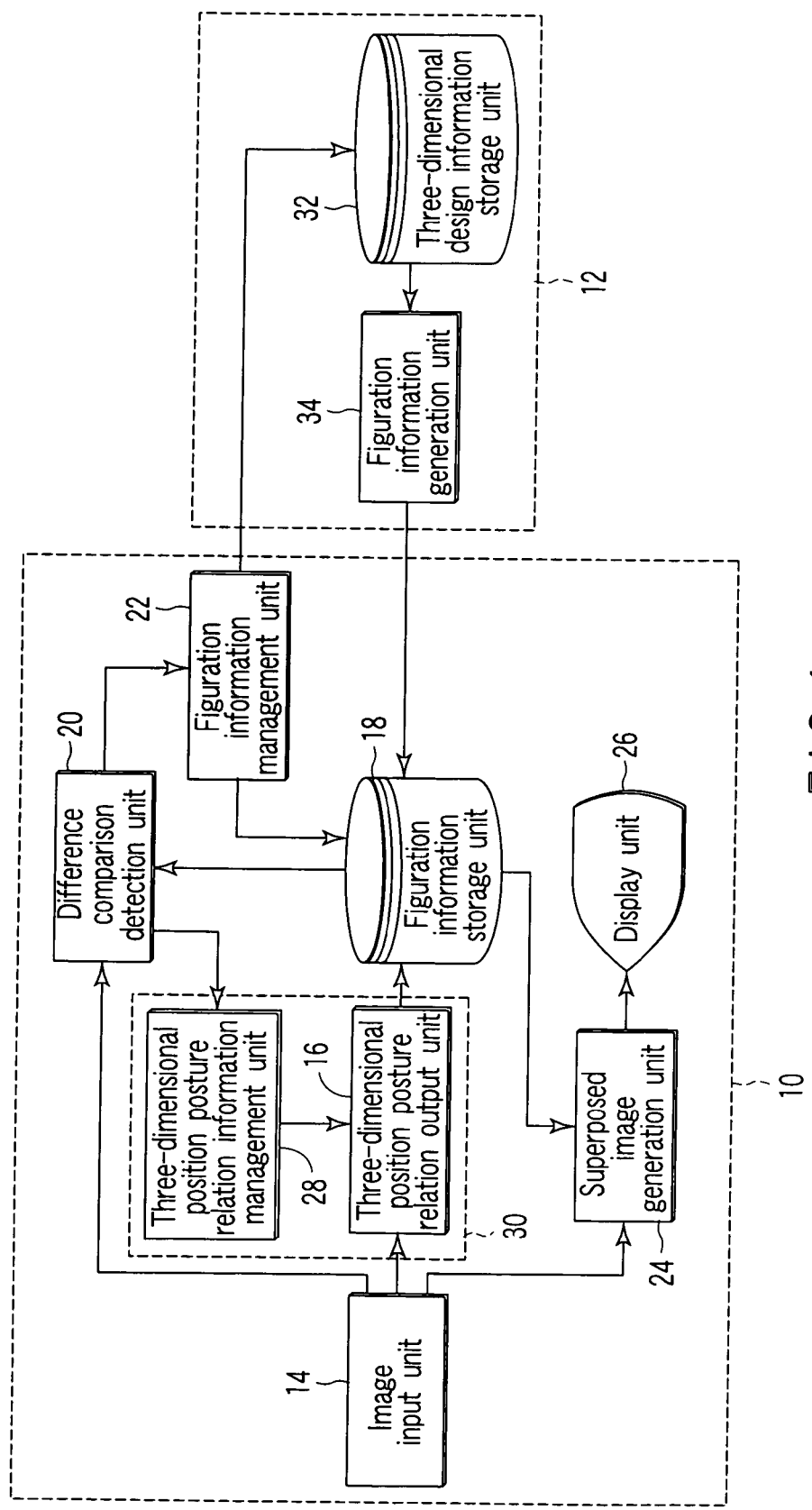
F I G. 1

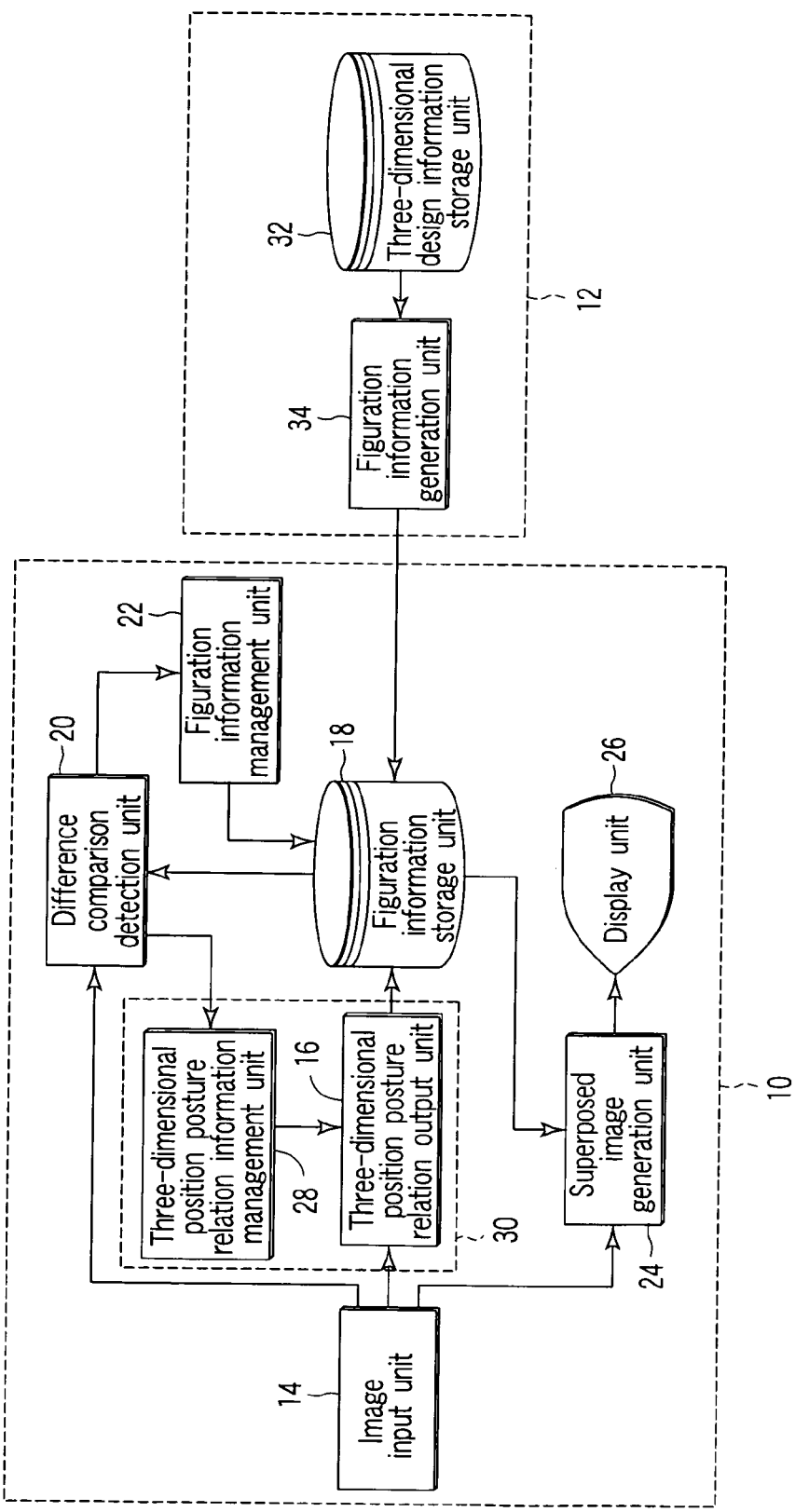
F I G. 14

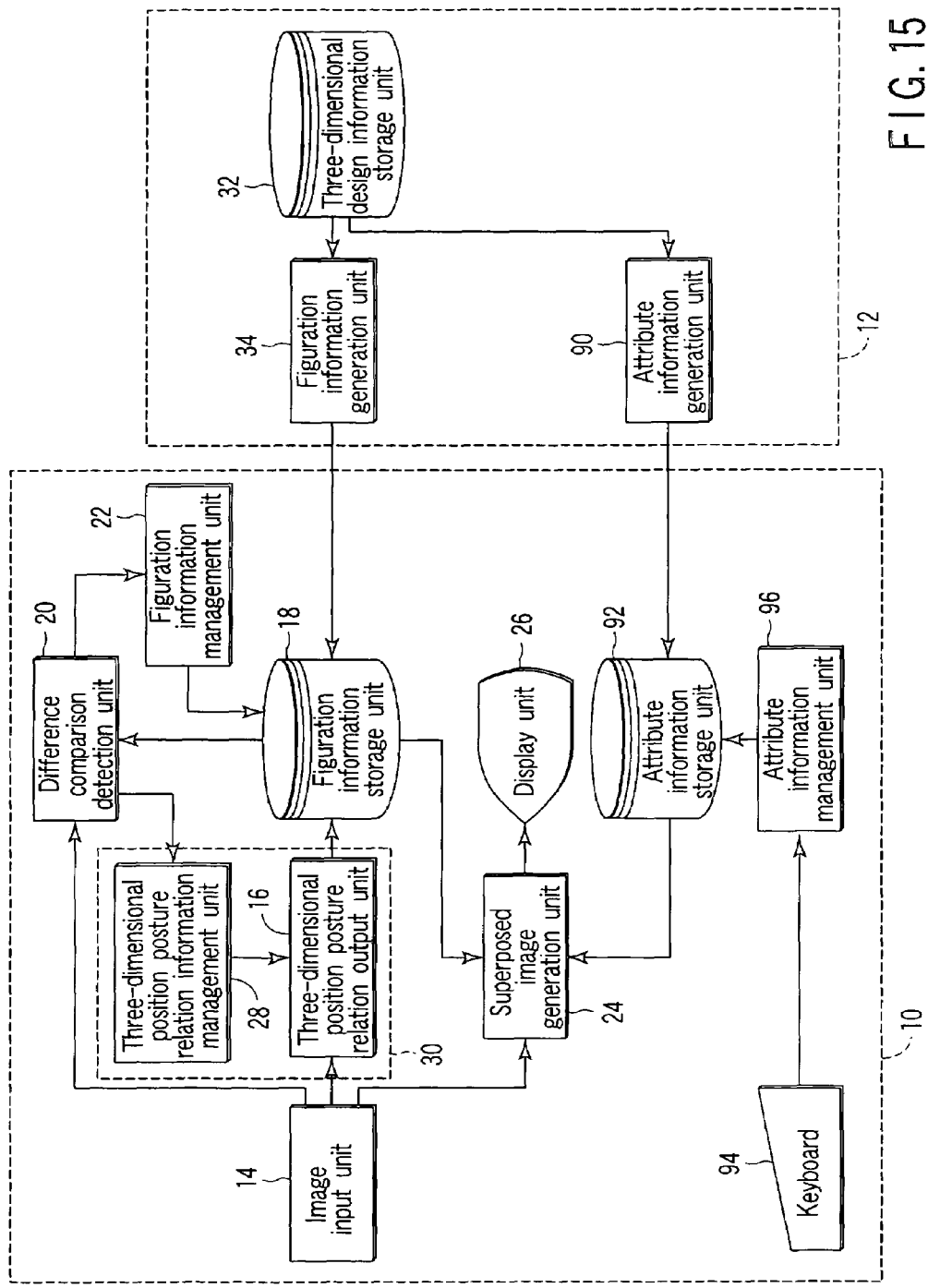
F I G. 15

INFORMATION PRESENTATION APPARATUS AND INFORMATION PRESENTATION SYSTEM USING THE SAME

CROSS REFERENCE TO RELATED APPLICATIONS

This is a Continuation Application of PCT Application No. PCT/JP2004/009786, filed Jul. 2, 2004, which was published under PCT Article 21(2) in Japanese.

This application is based upon and claims the benefit of priority from prior Japanese Patent Applications No. 2003-273565, filed Jul. 11, 2003; No. 2003-273566, filed Jul. 11, 2003; No. 2003-355462, filed Oct. 15, 2003; and No. 2003-400768, filed Nov. 28, 2003, the entire contents of all of which are incorporated herein by reference.

BACKGROUND OF THE INVENTION

1. Field of the Invention

The present invention relates to an information presentation apparatus and an information presentation system using the same that display captured images and information concerning the captured images concurrently by superposing the information on the images so as to make it possible to present high-density information to an image observer.

2. Description of the Related Art

As an information presentation apparatus for presenting predetermined related information for a target object and/or a prescribed marker of the real world, there are well known bar-code readers.

Of those, there is disclosed an apparatus for presenting information utilizing spatial assigned position information of a target object and/or a prescribed marker in U.S. Pat. No. 6,389,182. This apparatus captures out a two-dimensional code as a marker printed on a business card being a target object using a camera, and analyzes thus two-dimensionally coded ID using a program stored in a computer. Then, the apparatus reads out facial portrait image data of a person corresponding to thus analyzed ID from an image database, and displays thus read out facial portrait image at the side of the two-dimensional code on an image of the name card captured by the camera which is displayed on a computer display. As a result, the facial portrait image is displayed as if the image is located at the side of the two-dimensional code on the name card.

On the other hand, there is disclosed a system that compares a target object in the real space captured by an image input means such as a CCD capturing device, for example an image of an actual building structure, and design information owned by a three-dimensional CAD system, and carries out mutual verification to detect a difference (deviation) therebetween, so as to make the design information coincide with the target object in the real space, in Jpn. Pat. Appln. KOKAI Publication No. 2002-92044.

BRIEF SUMMARY OF THE INVENTION

According to a first aspect of the present invention, there is provided an information presentation apparatus comprising: an image input unit configured to input an image of a target object in a real space, a three-dimensional position posture relation detection unit configured to detect a relation of relative three-dimensional position and posture between the image input unit and the target object using the image of the target object input from the image input unit, a figuration information storage unit configured to store figuration information of the target object, a difference comparison detection unit configured to compare the position and posture of the target object detected by the three-dimensional position posture relation detection unit and a value stored in the figuration information storage unit corresponding to a part of the target object input from the image input unit so as to detect a difference between an actual position and posture of the input target object and stored figuration information of the target object, a figuration information management unit configured to reflect a value of the difference from the difference comparison detection unit on figuration information stored in the figuration information storage unit, a superposed image generation unit configured to generate an image which is obtained by superposing the image of the target object input from the image input unit and figuration information of the target object stored in the figuration information storage unit, and a display unit configured to display the image generated by the superposed image generation unit.

It is desirable that the three-dimensional position posture relation detection unit includes a three-dimensional position posture relation output unit configured to detect and output the relation of relative three-dimensional position and posture between the image input unit and the target object using an image of the target object input from the image input unit, and a three-dimensional position posture information management unit configured to reflect a value of the difference from the difference comparison detection unit on the relation of relative three-dimensional position and posture between the image input unit and the target object detected by the three-dimensional position posture relation output unit.

According to a second aspect of the present invention, there is provided an information presentation system comprising: an information presentation apparatus including an image input unit configured to input an image of a target object in a real space, a three-dimensional position posture relation detection unit configured to detect a relation of relative three-dimensional position and posture between the image input unit and the target object using the image of the target object input from the image input unit, a figuration information storage unit configured to store figuration information of the target object, a difference comparison detection unit configured to compare the position and posture of the target object detected by the three-dimensional position posture relation detection unit and a value stored in the figuration information storage unit corresponding to a part of the target object input from the image input unit so as to detect a difference between an actual position and posture of the input target object and stored figuration information of the target object, a figuration information management unit configured to reflect a value of the difference from the difference comparison detection unit on figuration information stored in the figuration information storage unit, a superposed image generation unit configured to generate an image which is obtained by superposing the image of the target object input from the image input unit and figuration information of the target object stored in the figuration information storage unit, and a display unit configured to display the image generated by the superposed image generation unit; and a three-dimensional CAD including a three-dimensional design information storage unit configured to store three-dimensional design information of the target object, and a figuration information generation unit configured to generate figuration information using three-dimensional design information stored in the three-dimensional design information storage unit, wherein the figuration information storage unit of the information presentation apparatus stores figuration information generated by the figuration information generation unit of the three-dimensional CAD.

It is desirable that the three-dimensional position posture relation detection unit of the information presentation apparatus includes a three-dimensional position posture relation output unit configured to detect and output the relation of relative three-dimensional position and posture between the image input unit and the target object using an image of the target object input from the image input unit, and a three-dimensional position posture information management unit configured to reflect a value of the difference from the difference comparison detection unit on the relation of relative three-dimensional position and posture between the image input unit and the target object detected by the three-dimensional position posture relation output unit.

According to a third aspect of the present invention, there is provided an information presentation apparatus comprising image input means for inputting an image of a target object in a real space, three-dimensional position posture relation detection means for detecting a relation of relative three-dimensional position and posture between the image input means and the target object using the image of the target object input from the image input means, figuration information storage means for storing figuration information of the target object, difference comparison detection means for comparing the position and posture of the target object detected by the three-dimensional position posture relation detection means and a value stored in the figuration information storage means corresponding to a part of the target object input from the image input means so as to detect a difference between an actual position and posture of the input target object and stored figuration information of the target object, figuration information management means for reflecting a value of the difference from the difference comparison detection means on figuration information stored in the figuration information storage means, superposed image generation means for generating an image which is obtained by superposing the image of the target object input from the image input means and figuration information of the target object stored in the figuration information storage means, and display means for displaying the image generated by the superposed image generation means.

According to a fourth aspect of the present invention, there is provided an information presentation system, comprising: an information presentation apparatus including image input means for inputting an image of a target object in a real space, three-dimensional position posture relation detection means for detecting a relation of relative three-dimensional position and posture between the image input means and the target object using the image of the target object input from the image input means, figuration information storage means for storing figuration information of the target object, difference comparison detection means for comparing the position and posture of the target object detected by the three-dimensional position posture relation detection means and a value stored in the figuration information storage means corresponding to a part of the target object input from the image input means so as to detect a difference between an actual position and posture of the input target object and stored figuration information of the target object, figuration information management means for reflecting a value of the difference from the difference comparison detection means on figuration information stored in the figuration information storage means, superposed image generation means for generating an image which is obtained by superposing the image of the target object input from the image input means and figuration information of the target object stored in the figuration information storage means, and display means for displaying the image generated by the superposed image generation means; and a three-dimensional CAD including three-dimensional design information storage means for storing three-dimensional design information of the target object, and figuration information generation means for generating figuration information using three-dimensional design information stored in the three-dimensional design information storage means, wherein the figuration information storage means of the information presentation apparatus stores figuration information generated by the figuration information generation means of the three-dimensional CAD.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 shows a block diagram of an information presentation apparatus and an information presentation system using the same of the first embodiment according to the present invention;

FIG. 14 shows a block diagram of an information presentation apparatus and an information presentation system using the same of a variation of the first embodiment;

FIG. 15 shows a block diagram of an information presentation apparatus and an information presentation system using the same of a variation of the fourth embodiment;

DETAILED DESCRIPTION OF THE INVENTION

First Embodiment

Figure 2:
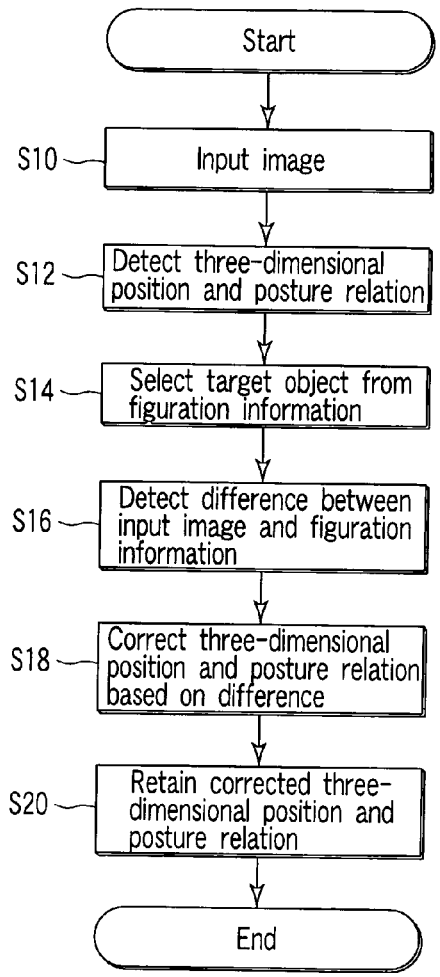
FIG. 2 shows a flowchart indicative of the procedure of association (registration) processing for the real space and the model space.

As shown in FIG. 1, an information presentation system of the first embodiment according to the present invention includes a small-sized portable information presentation apparatus 10 such as a PDA equipped with a camera or a notebook-sized personal computer, which is an information presentation apparatus of the first embodiment according to the present invention, and a three-dimensional CAD 12 arranged in an office, etc.

The information presentation apparatus 10 includes an image input unit 14, a three-dimensional position posture relation output unit 16, a figuration information storage unit 18, a difference comparison detection unit 20, a figuration information management unit 22, a superposed image generation unit 24, a display unit 26, and a three-dimensional position posture relation information management unit 28.

The image input unit 14 is a camera, etc., that takes in (captures) image data of a target object in the real space. The three-dimensional position posture relation output unit 16 is provided with a function of detecting the relation of relative three-dimensional position and posture between the image input unit 14 and the target object using an image of the target object sent from the image input unit 14. The figuration information storage unit 18 is a memory, etc. that stores figuration information of the target object.

The difference comparison detection unit 20 is provided with a function of comparing the position and posture of the target object detected by the three-dimensional position posture relation output unit 16 and a value stored in the figuration information storage unit 18 corresponding to a part of the target object sent from the image input unit 14 so as to detect the difference between the received actual position and posture of the target object and stored figuration information of the target object. The figuration information management unit 22 is provided with a function of reflecting a value of the difference sent from the difference comparison detection unit 20 on figuration information stored in the figuration information storage unit 18.

The superposed image generation unit 24 is provided with a function of generating an image which is obtained by superposing an image of the target object sent from the image input unit 14 and figuration information of the target object stored in the figuration information storage unit 18. The display unit 26 is a liquid crystal display or the like for displaying an image which is generated by the superposed image generation unit 24.

The three-dimensional position posture relation information management unit 28 is provided with a function of reflecting a value of the difference sent from the difference comparison detection unit 20 on the relation of relative three-dimensional position and posture between the image input unit 14 and the target object detected by the three-dimensional position posture relation output unit 16. The three-dimensional position posture relation output unit 16 and the three-dimensional position posture relation information management unit 28 configure a three-dimensional position posture relation detection unit 30.

The three-dimensional CAD 12 includes a three-dimensional design information storage unit 32, and a figuration information generation unit 34. The three-dimensional design information storage unit 32 is a storage device of large capacity such as a hard disc to store three-dimensional design information of the target object. The figuration information generation unit 34 is provided with a function of generating figuration information using three-dimensional design information stored in the three-dimensional design information storage unit 32.

Figuration information stored in the figuration information storage unit 18 of the information presentation apparatus is information that is generated by the figuration information generation unit 34 of the three-dimensional CAD 12. The figuration information generation unit 34 can transmit figuration information to the figuration information storage unit 18 online by the wireless or wire communication, or offline through a storage medium of some kind.

The "three-dimensional design information of the target object" is information necessary for manufacturing and arranging the target object such as figurations, colors, materials, part names and the like. The figuration information generation unit 34 extracts only information of figurations among the three-dimensional design information of the target object. Furthermore, the target object and the figuration information have a peculiar coordinate system, respectively, and a coordinate system of the target object is referred to as "real space", while a coordinate system of the figuration information is referred to as "model space".

The figuration information management unit 22 of the information presentation apparatus 10 is so configured as to reflect a value of the difference sent from the difference comparison detection unit 20 on three-dimensional design information stored in the three-dimensional design information storage unit 32 of the three-dimensional CAD 12, or original figuration information, similar to the extracted figuration information stored in the figuration information storage unit 18. In this case, information can be transmitted from the figuration information management unit 22 to the three-dimensional design information storage unit 32 of the three-dimensional CAD 12 online or offline.

Next, the operation of this configuration will be explained.

In the embodiment, firstly, as the preprocessing, association (registration) is carried out for the real space and the model space. That is, using a target object itself, a target object on the real space and a target object model on the model space formed using figuration information are superposed to be displayed on the display unit 26, and the target object model on the model space is shifted such that both of them overlap each other, thereby association being carried out for the real space and the model space. Then, a shift amount of the target object model at the time of the association processing is recorded to be used for the association for the real space and the model space.

After the association processing, since coordinate systems of the real space and the model space are made to correspond to each other, in case there is a difference at the time of superposing and displaying processing, consistency is not ensured between the target object and the target object model (the target object is not consistent with the figuration information).

The association (registration) processing for the real space and the model space is carried out as shown in a flowchart of FIG. 2.

That is, the image input unit 14 captures a target object (step S10). In the registration, a target object whose figuration in the real space and whose figuration information in the model space are known to be coincident with each other in advance is used. Such a target object may be registered as a landmark for registration.

Then, the three-dimensional position posture relation output unit 16 detects the relative three-dimensional position and posture between the image input unit 14 and the target object using an image of the target object captured by the image input unit 14 (step S12). At this time, since the association (registration) for the real space and the model space is not completed, there is a difference between them.

The detection of the three-dimensional position and posture can be carried out by employing a method for detecting a marker and presuming position and posture information disclosed in U.S. Pat. No. 6,577,249, in which a target object is considered to be a marker.

The three-dimensional position posture relation output unit 16 further selects figuration information corresponding to the target object from the figuration information storage unit 18 based on an image of the target object captured by the image input unit 14 (step S14). In this case, as described above, since a target object whose figuration in the real space and whose figuration information in the model space are known to be coincident with each other in advance is used in the registration, figuration information can be automatically selected. In the drawing, for the sake of simplification, thus selected figuration information is so depicted as to be directly sent to the difference comparison detection unit 20. Actually, the three-dimensional position posture relation output unit 16 changes thus selected figuration information based on the detected three-dimensional position and posture, and sends thus changed figuration information to the difference comparison detection unit 20.

Figure 3B:
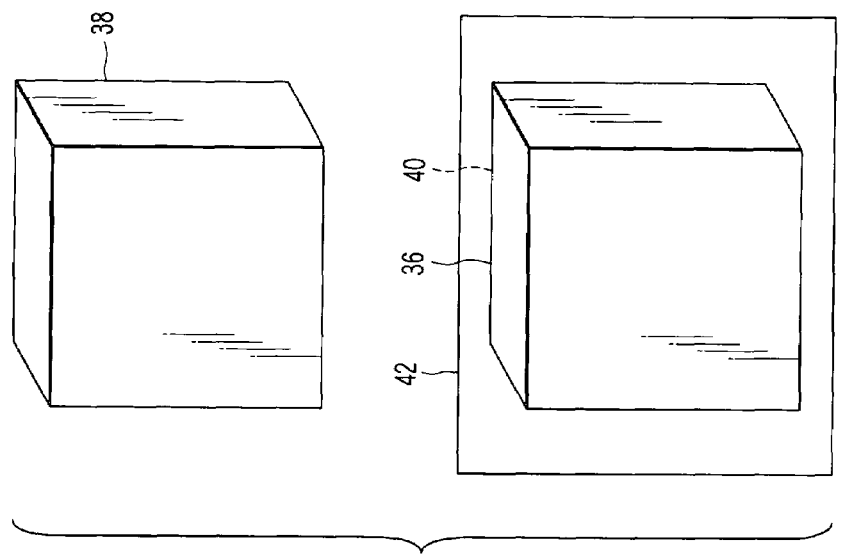
FIG. 3B shows a view of a target object and the display state thereof after registration processing is completed.
Figure 3A:
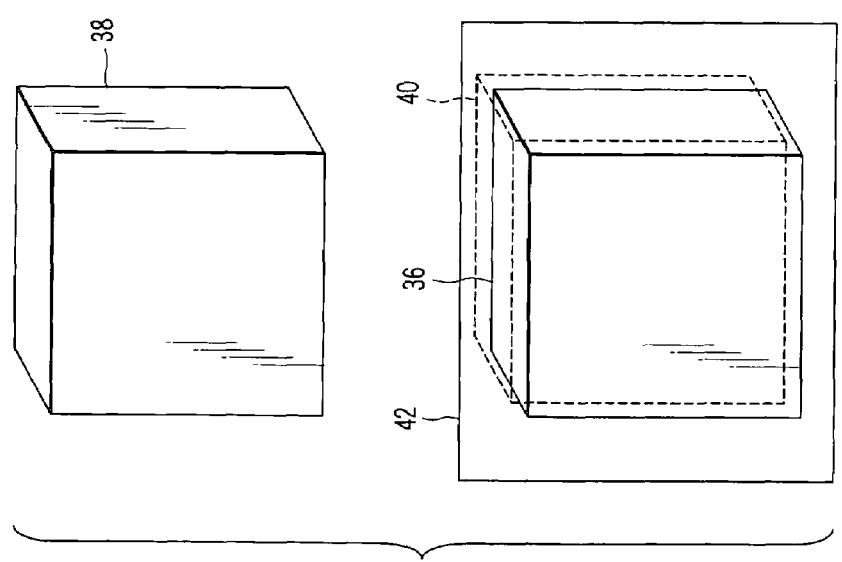
FIG. 3A shows a view of a target object and the display state thereof before registration processing is completed.

Then, the difference comparison detection unit 20 detects a difference between an input image from the image input unit 14 and the figuration information that is selected from the figuration information storage unit 18 and changed (step S16). In this case, a difference is raised since the association for the real space and the model space is not carried out correctly. That is, when the superposed image generation unit 24 generates an image obtained by superposing an input image from the image input unit 14 and the selected figuration information and displaying thus generated image on the display unit 26, as shown in FIG. 3A, an image 36 of a target object 38 and a target object model 40 formed using figuration information of the target object are displayed on a screen 42 of the display unit 26 with their positions deviated.

Based on a difference detected by the difference comparison detection unit 20, the three-dimensional position posture relation information management unit 28 corrects information concerning the relation of relative three-dimensional position and posture between the image input unit 14 and the target object 38 such that the difference becomes minimum (step S18).

Then, the three-dimensional position posture relation information management unit 28 supplies thus corrected information concerning the relation of three-dimensional position and posture to the three-dimensional position posture relation output unit 16, thereby completing the association processing for coordinate systems of the real space and the model space (step S20). Accordingly, as shown in FIG. 3B, the image 36 of the target object 38 and the target object model 40 are displayed on the screen 42 of the display unit 26 with their positions made to coincide with each other.

After the preprocessing, a difference between a target object in the real space and design information (or figuration information in this embodiment) is accurately figured out, and the processing to make the design information and the actual target object coincide with each other is carried out.

Figure 4:
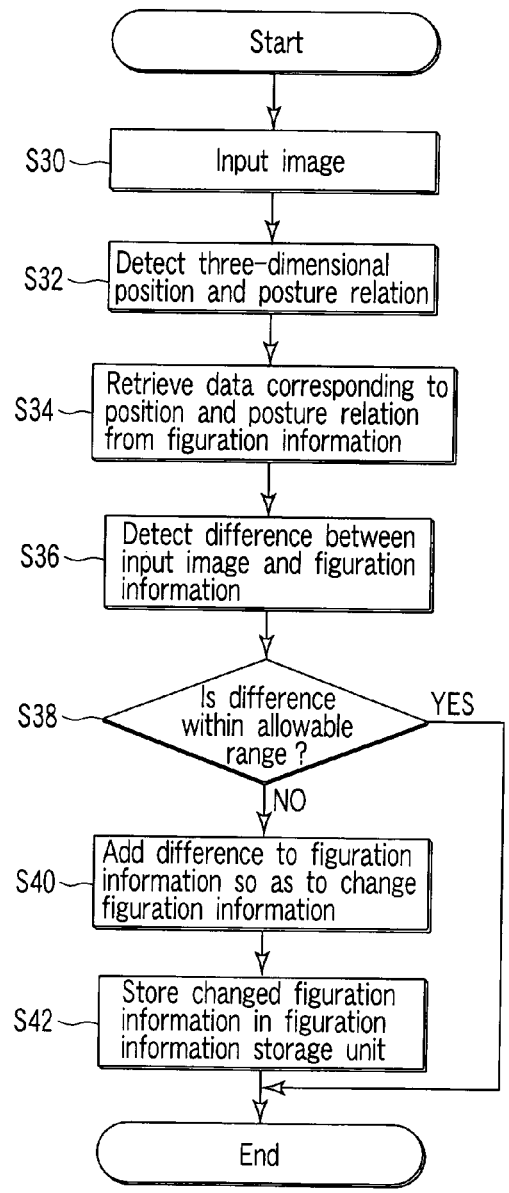
FIG. 4 shows a flowchart indicative of the processing to make a target object in the real space and design information (figuration information) coincide with each other.

That is, as shown in a flowchart of FIG. 4, the image input unit 14 captures the target object 38 (step S30).

Then, the three-dimensional position posture relation output unit 16 detects the relative three-dimensional position and posture between the image input unit 14 and the target object 38 using the image 36 of the target object 38 captured by the image input unit 14 (step S32). At this time, since the association (registration) for the real space and the model space is completed, there is no difference between them.

Next, the three-dimensional position posture relation output unit 16 retrieves data corresponding to the detected three-dimensional position and posture from a plurality of items of figuration information stored in the figuration information storage unit 18 (step S34). Thus retrieved figuration information is sent to the difference comparison detection unit 20.

Then, the difference comparison detection unit 20 detects a difference between an input image from the image input unit 14 and figuration information that is retrieved from the figuration information storage unit 18 (step S36). The difference to be detected is, for example, a shift amount of figuration information. The shift amount may be of the parallel shift, expansion, shrinkage, rotation, or combination thereof.

The figuration information management unit 22 judges whether or not a difference detected by the difference comparison detection unit 20 is within an allowable range (step S38). In the case of being within the allowable range, it is not necessary to carry out the subsequent processing.

On the other hand, in the case where thus detected difference is not within the allowable range (step S38), the figuration information management unit 22 further adds the detected difference to the figuration information that is retrieved from the figuration information storage unit 18 so as to change the figuration information (step S40). That is, since the figuration of the target object 38 that was formed already cannot be changed, the figuration information is changed.

Then, the figuration information management unit 22 stores thus changed figuration information in the figuration information storage unit 18, thereby reflecting the change (step S42).

Figures 5A, 5B:
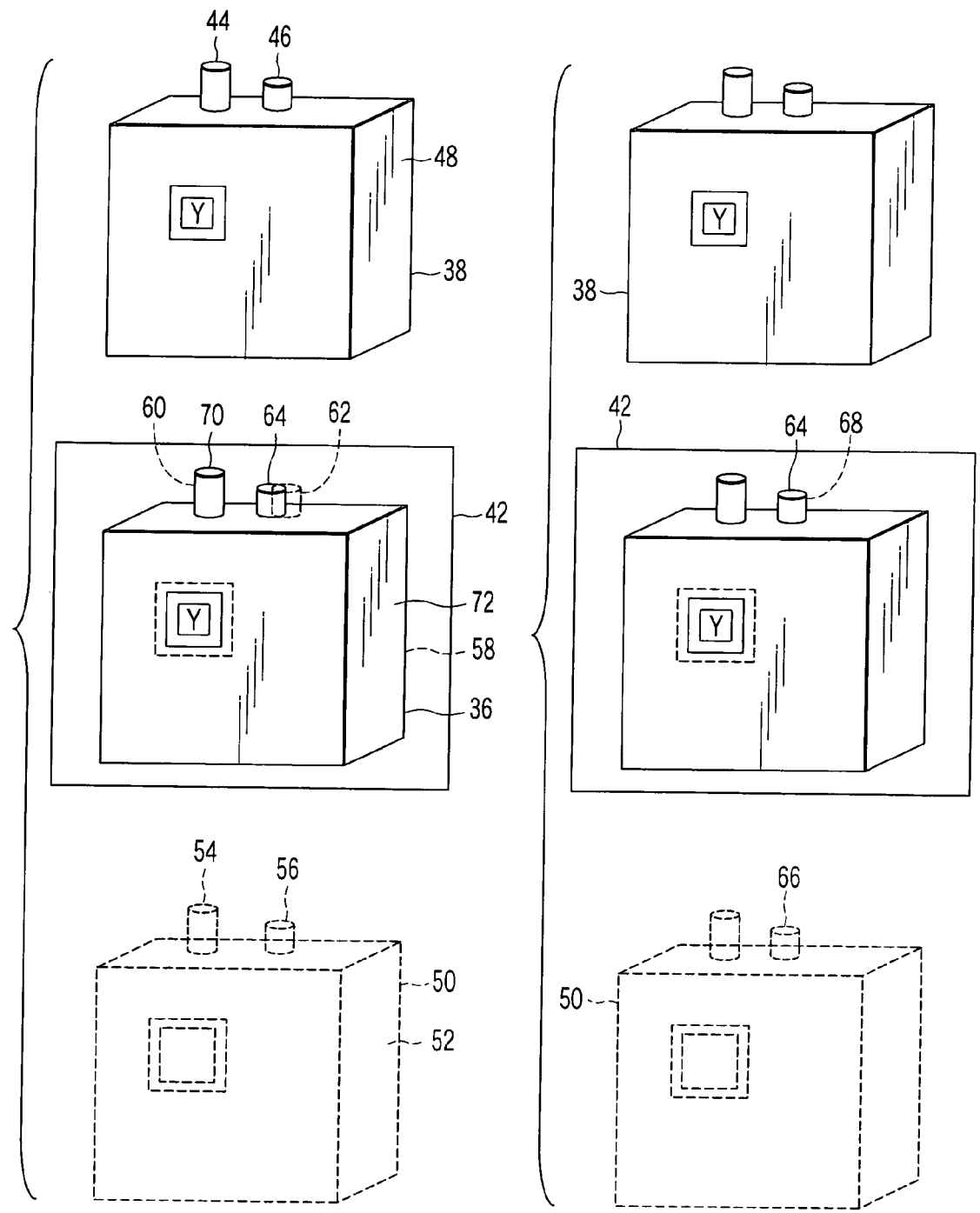
FIG. 5A shows a view of a target object and the display state thereof and figuration information of the target object before the processing to make a target object in the real space and design information (figuration information) coincide with each other is completed.
FIG. 5B shows a view of a target object and the display state thereof and figuration information of the target object after the processing to make a target object in the real space and design information (figuration information) coincide with each other is completed.

For example, it is assumed that the image input unit 14 captures a main body 48 and parts 44, 46 attached thereto as the target object 38, as shown in FIG. 5A. In this case, figuration information 50 corresponding to the target object 38 composed of figuration information 52 of the main body 48, figuration information 54 of the part 44, and figuration information 56 of the part 46 is retrieved, and the image 36 of the target object 38 and the figuration information 50 are compared by the difference comparison detection unit 20. At this time, the superposed image generation unit 24 generates an image obtained by superposing the image 36 of the target object 38 and the target object model 40 (a model 58 of the main body 48, a model 60 of the part 44, and a model 62 of the part 46) formed using the figuration information 50, and displays thus generated image on the display unit 26.

In case there is a difference between the attachment position for the actual part 46 and the figuration information 56 of the part 46, as shown in the same drawing, an image 64 of the part 46 and the model 62 thereof are displayed on the screen 42 of the display unit 26 with their positions deviated. This difference is cancelled when the figuration information 56 of the part 46 is changed into figuration information 66 shown in FIG. 5B in the operation of step S40 and step S42, and then the image 64 of the part 46 and a changed model 68 thereof are superposed to be displayed on the screen 42 with their positions made to coincide with each other.

Furthermore, as shown in FIG. 5A, since there is no difference between the attachment position for the actual part 44 and the figuration information 54 of the part 44, as well as the main body 48 and the figuration information 52 thereof, respectively, an image 70 of the part 44 and the model 60 thereof, and an image 72 of the main body 48 and the model 58 thereof are displayed on the screen 42 of the display unit 26 with their positions made to coincide with each other. Thus, in this case, operations of step S40 and step S42 are not carried out.

As described above, changed figuration information can be returned from the figuration information management unit 22 to the three-dimensional design information storage unit 32 of the three-dimensional CAD 12.

Second Embodiment

In the first embodiment, it is necessary that, in the association (registration) processing for the real space and the model space, a target object whose figuration in the real space and whose figuration information in the model space are known to be coincident with each other in advance is used as the target object 38.

On the other hand, there may be brought about a case in which such target object 38 is not necessarily prepared.

Accordingly, in the second embodiment, at the time of the registration, a marker is shiftably arranged on the target object 38 by adhesion processing etc. so as to make it possible to use the target object 38 whose figuration in the real space and whose figuration information in the model space are not coincident with each other.

That is, in case the three-dimensional position posture relation output unit 16 detects the three-dimensional position and posture, and the difference comparison detection unit 20 compares the image 36 of the target object 38 and the figuration information 50 of the target object 38, there is detected a difference therebetween. In this case, since a marker is used as a criterion, an image of the marker and figuration information of the marker coincide with each other. Accordingly, in this case, even though an image 74 of a marker 76 and a model 78 of the marker 76 are displayed on the screen 42 of the display unit 26 with their positions made to coincide with each other, the image 36 of the target object 38 and the target object model 40 are displayed with their positions deviated, as shown in FIG. 6A.

Figure 6B:
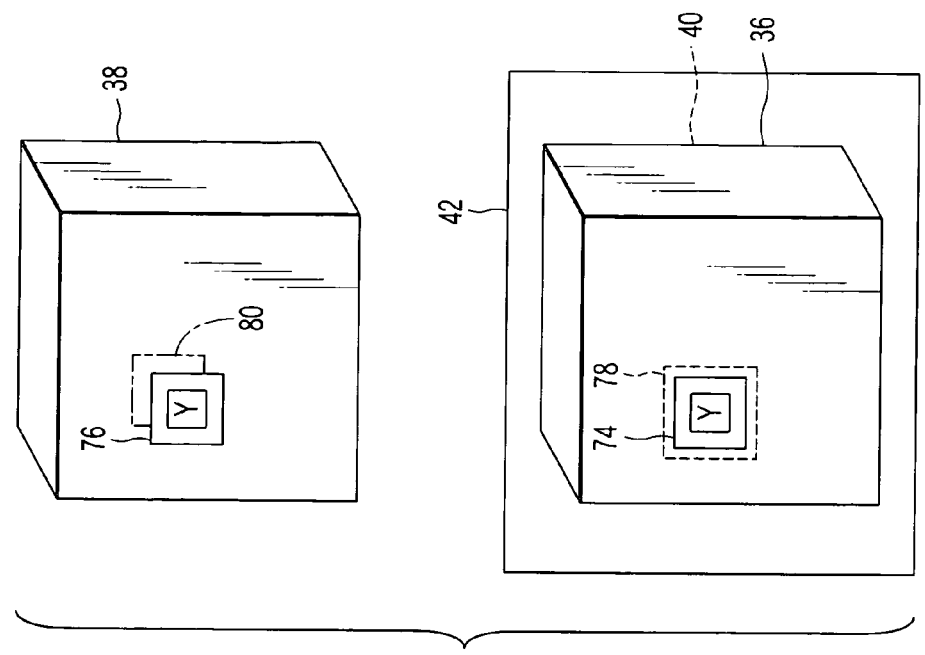
FIG. 6B shows a view of a target object and the display state thereof after registration processing is completed.
Figure 6A:
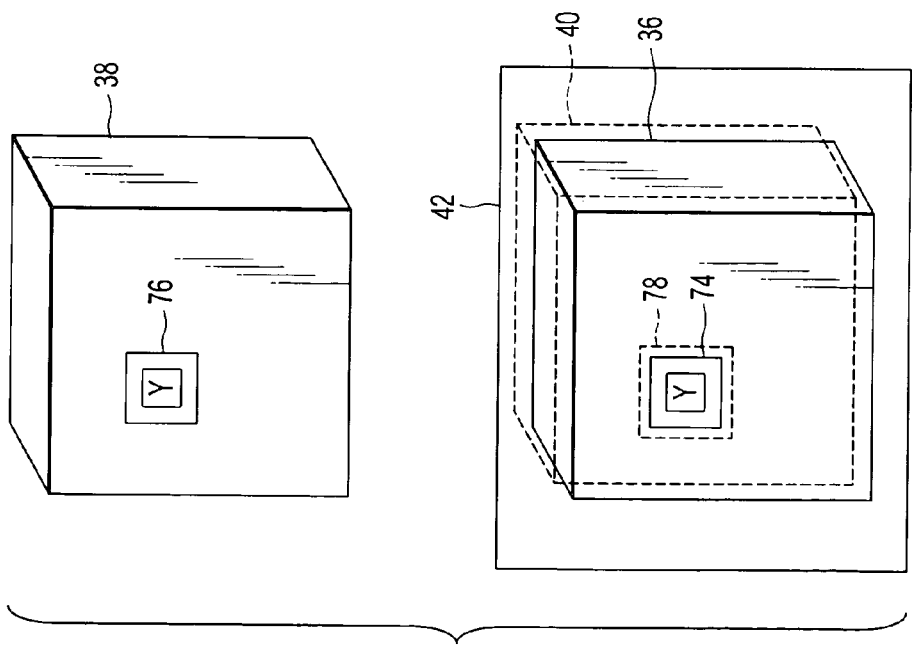
FIG. 6A shows a view of a target object and the display state thereof before registration processing in the second embodiment is completed.

So, in this embodiment, the three-dimensional position posture relation information management unit 28 that is used in the first embodiment is not used, and the target object 38 and the figuration information 50 of the target object 38 are made to coincide with each other by shifting the position of the actual marker 76 against the target object 38, as shown in FIG. 6B. That is, an image viewer takes a view of the image 36 of the captured target object 38 and the target object model 40 thereof which are displayed on the display unit 26, and shifts the position of the marker 76 from a position 80 of the marker before being shifted such that both of them coincide with each other.

Figure 7:
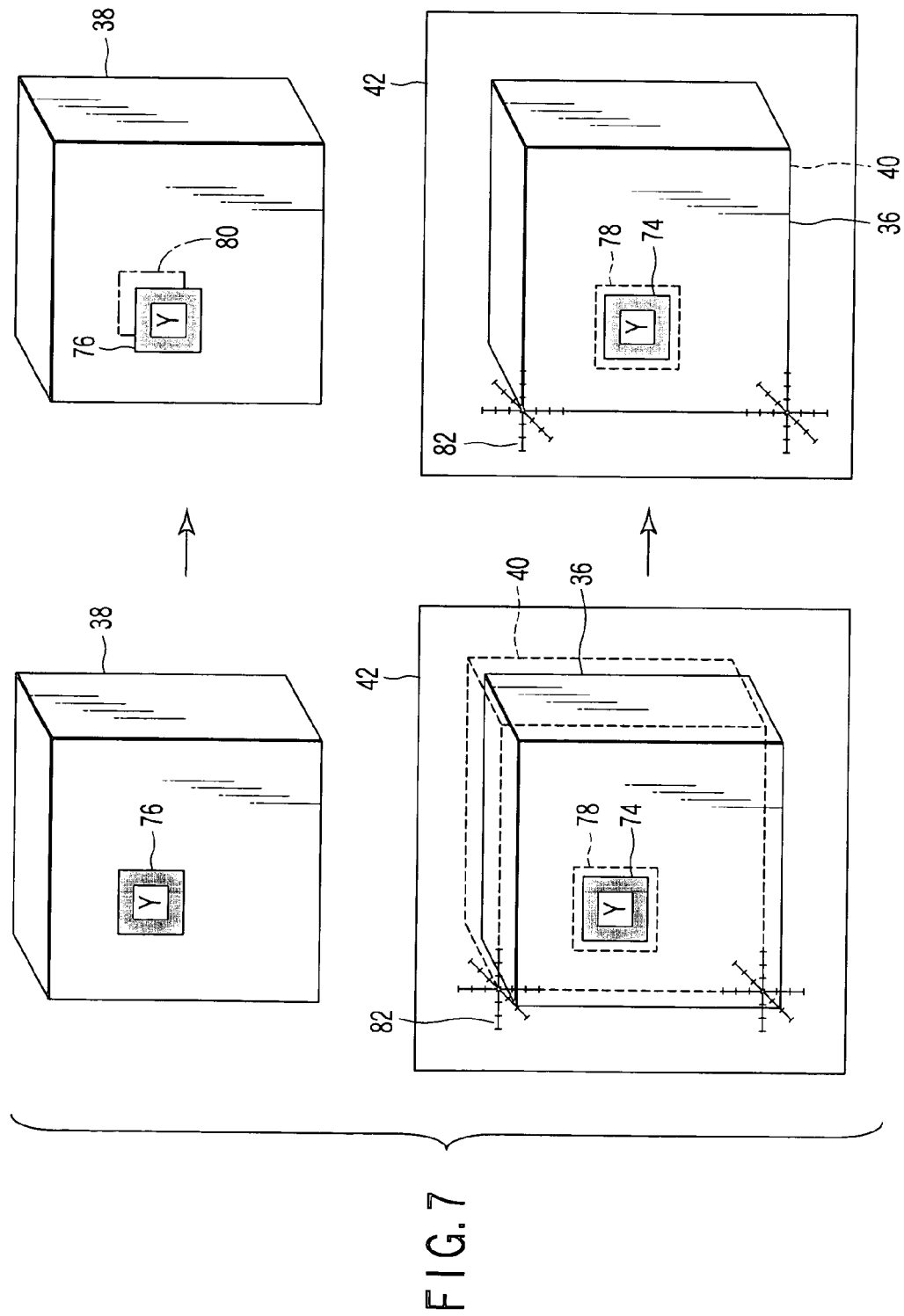
FIG. 7 shows a view of a target object and the display state thereof before and after registration processing is completed, which is employed to explain a variation of the second embodiment.

Furthermore, in this case, so as to make it easy to shift the position of the marker 76, in addition to the image 36 of the target object 38 and the target object model 40, as well as the image 74 of the marker 76 and the model 78 of the marker 76, a scale 82 may be appended to the target object model 40 to be displayed on the screen 42 of the display unit 26, as shown in FIG. 7. Displaying the scale 82, an image viewer can confirm a deviation amount using the scale 82 on the screen 42 to shift the marker 76 on the target object 38 depending on thus confirmed deviation amount.

Third Embodiment

In the third embodiment, at the time of the registration, the target object 38 whose figuration in the real space and whose figuration information in the model space are not coincide with each other is used, similar to the second embodiment. In the third embodiment, on the other hand, the marker 76 is arranged on the target object 38 by adhesion or printing processing, etc., and the marker 76 cannot be shifted.

Figures 8A, 8B:
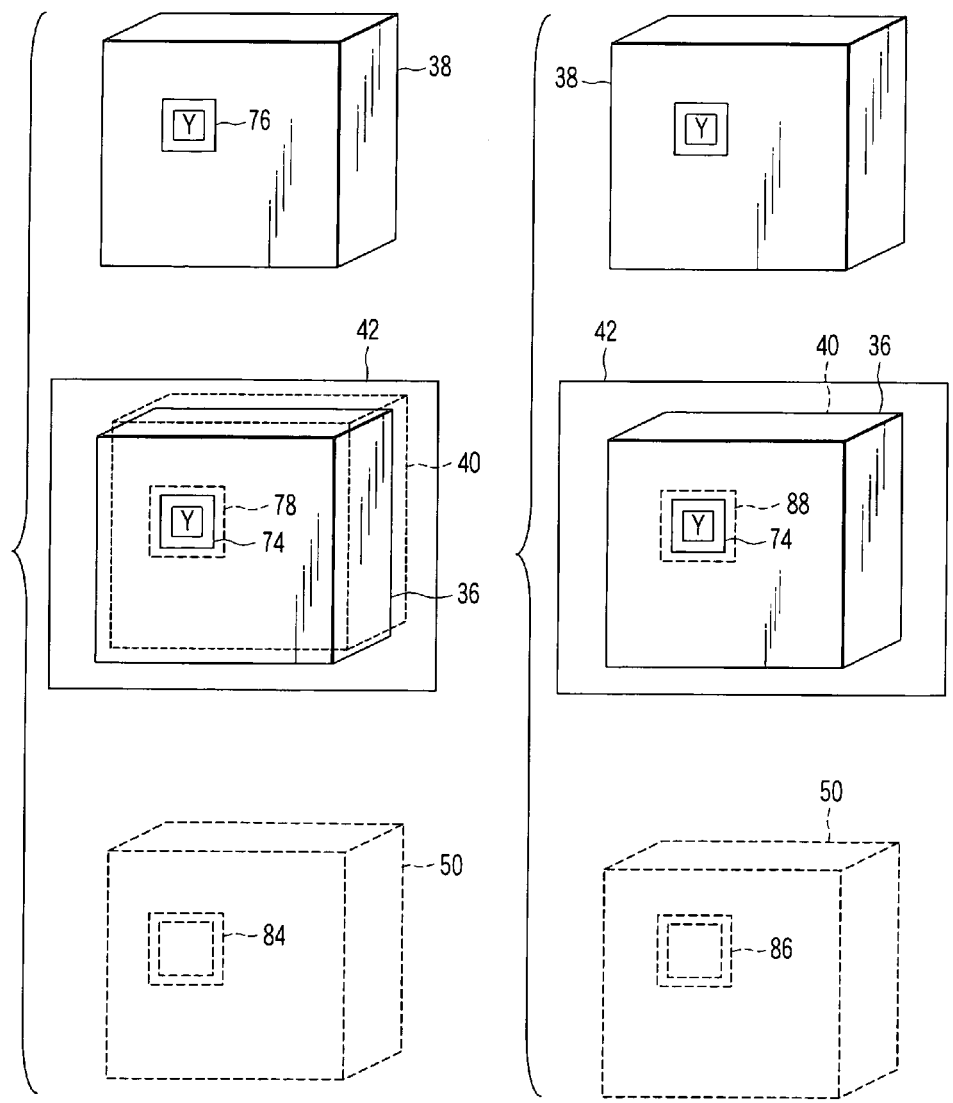
FIG. 8A shows a view of a target object and the display state thereof and figuration information of the target object before registration processing in the third embodiment is completed.
FIG. 8B shows a view of a target object and the display state thereof and figuration information of the target object after registration processing is completed.

That is, in case the three-dimensional position posture relation output unit 16 detects the three-dimensional position and posture, and the difference comparison detection unit 20 compares the image 36 of the target object 38 and the figuration information 50 of the target object 38, there is detected a difference therebetween. In this case, since the marker 76 is used as a criterion, the image 74 of the marker 76 and figuration information of the marker 76 coincide with each other. Accordingly, in this case, even though the image 74 of the marker 76 and the model 78 of the marker 76 are displayed on the screen 42 of the display unit 26 with their positions made to coincide with each other, the image 36 of the target object 38 and the target object model 40 are displayed with their positions deviated, as shown in FIG. 8A.

Accordingly, it is necessary that the three-dimensional position posture relation information management unit 28 reflects a value of the difference sent from the difference comparison detection unit 20 on the relation of relative three-dimensional position and posture between the image input unit 14 and the target object 38 detected by the three-dimensional position posture relation output unit 16. In this case, in this embodiment, the position and posture of figuration information 84 of the marker 76 with respect to the figuration information 50 of the target object 38 is shifted to set resulting information to be figuration information 86, as shown in FIG. 8B. As a result, as shown in FIG. 8B, the image 74 of the marker 76 and a model 88 whose marker 76 is shifted are displayed on the screen 42 of the display unit 26 with their positions made to coincide with each other, and also the image 36 of the target object 38 and the target object model 40 coincide with each other.

Figure 9A:
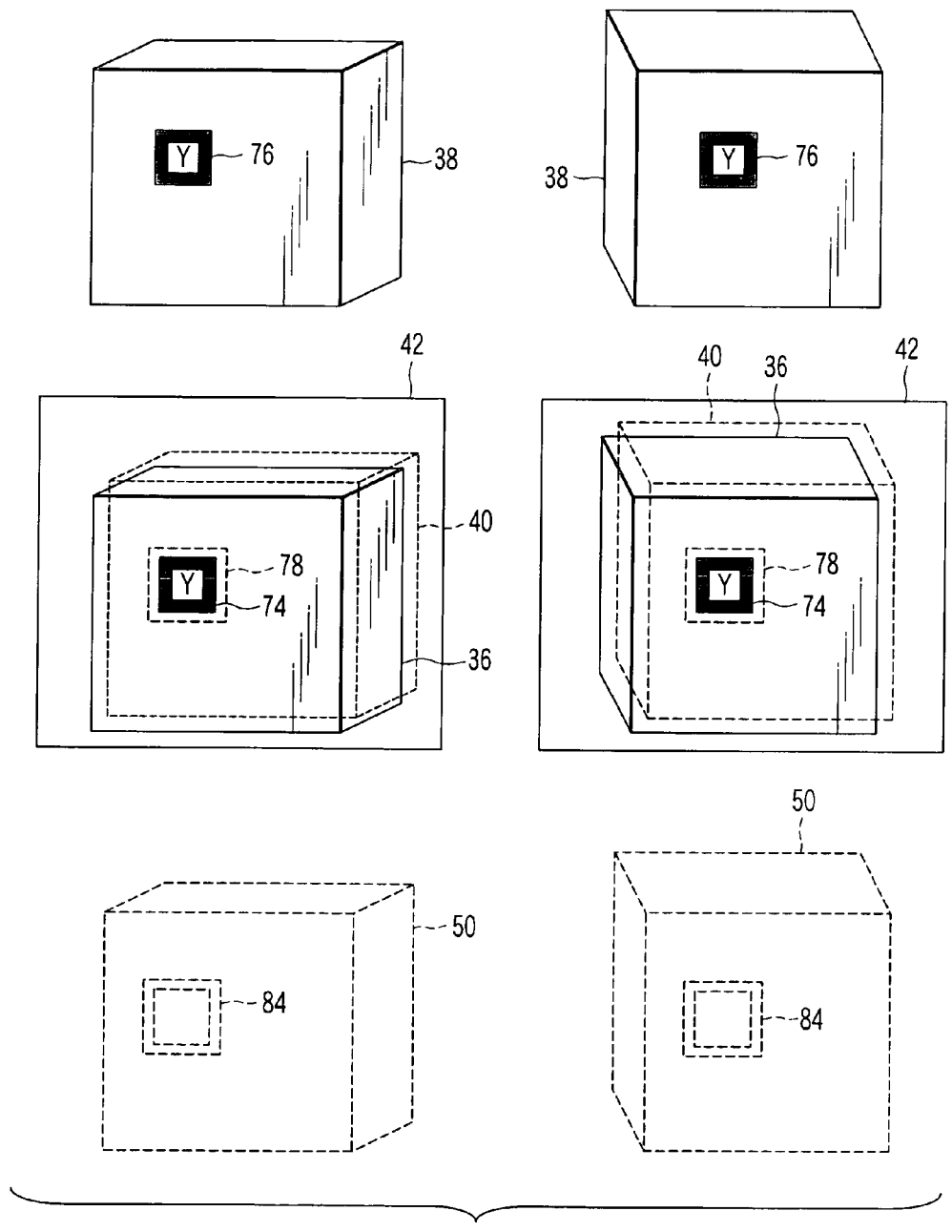
FIG. 9A shows a view of a target object and the display state thereof and figuration information of the target object before registration processing is completed, which is employed to explain a variation of the third embodiment.
Figure 9B:
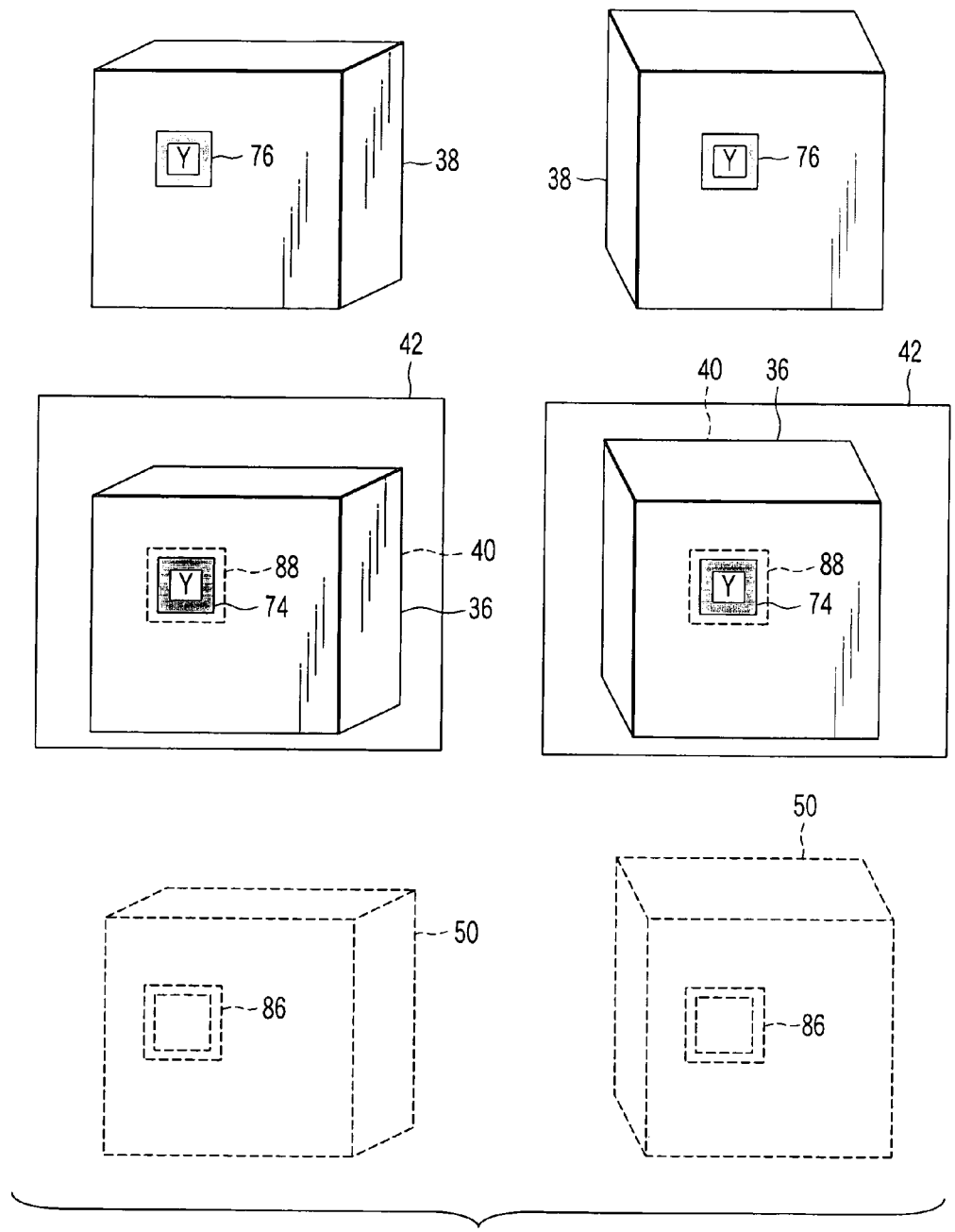
FIG. 9B shows a view of a target object and the display state thereof and figuration information of the target object after registration processing is completed, which is employed to explain a variation of the third embodiment.

There may be employed a configuration in which the target object 38 is captured from a plurality of directions by the image input unit 14 to generate still images, and when the position and posture of the figuration information 84 of the marker 76 with respect to the figuration information 50 of the target object 38 is shifted on any one of the plural still images, the shift is reflected on a counterpart still image. FIG. 9A shows the state before the figuration information 84 of the marker 76 with respect to the figuration information 50 of the target object 38 is shifted, while FIG. 9B shows the state after the figuration information 86 of the marker 76 with respect to the figuration information 50 of the target object 38 is shifted. In those drawings, components on the left line are viewed from one direction "a", while components on the right line are viewed from another direction "b".

In case a characteristic convexoconcave or pattern of the target object 38 is considered to be a marker and the registration is performed, the coincidence can be realized similar to the embodiment.

In this embodiment, the figuration information 84 of the marker 76 is shifted automatically. On the other hand, there may be employed a configuration in which a viewer specifies a shift direction or shift amount using a keyboard or the like. In this case, it is desirable that the scale 82 described in the second embodiment be appended to the target object model 40 to be displayed on the screen 42 of the display unit 26.

Fourth Embodiment

In the first embodiment, figuration information of a target object is stored, and a difference between an actually captured target object and the figuration information is detected to be reflected.

Figure 10:
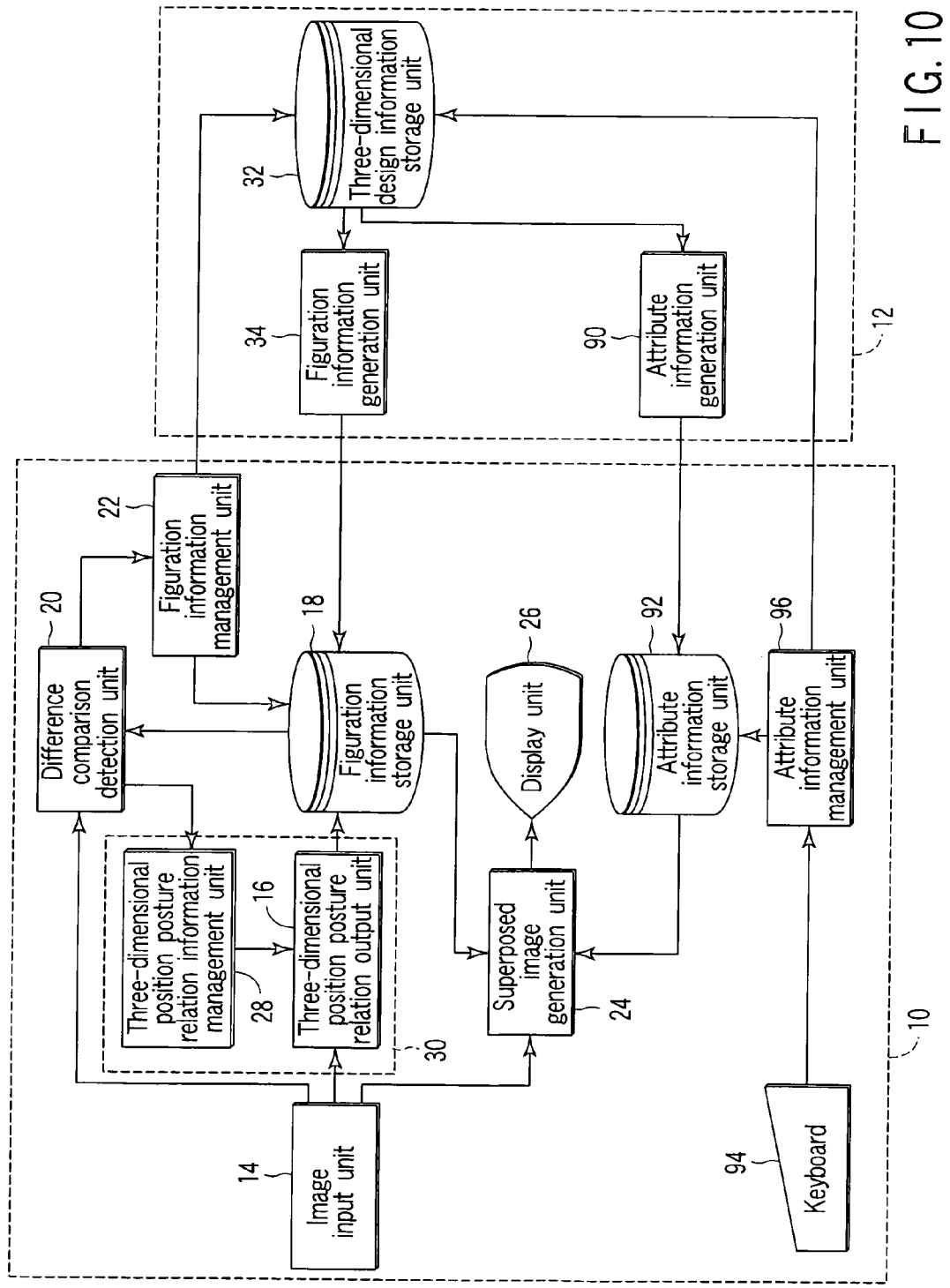
FIG. 10 shows a block diagram of an information presentation apparatus and an information presentation system using the same of the fourth embodiment according to the present invention.

Furthermore, there may be employed a configuration, in which attribute information of a target object such as part names is stored, and the change of the attribute information is reflected. So, an information presentation system of the fourth embodiment is configured as shown in FIG. 10.

That is, in addition to the configuration of the first embodiment, the three-dimensional CAD 12 further includes an attribute information generation unit 90 that is provided with a function of generating attribute information using three-dimensional design information of a target object stored in the three-dimensional design information storage unit 32.

Moreover, in addition to the configuration of the first embodiment, the information presentation apparatus 10 further includes an attribute information storage unit 92, a keyboard 94, and an attribute information management unit 96. The attribute information storage unit 92 is a memory etc., that stores attribute information generated by the attribute information generation unit 90 of the three-dimensional CAD 12. The attribute information management unit 96 is provided with a function of reflecting the change of attribute information input by the keyboard 94 as an input unit on attribute information stored in the attribute information storage unit 92.

The superposed image generation unit 24 of the information presentation apparatus 10 is so configured as to superpose an image of the target object sent from the image input unit 14, figuration information of the target object stored in the figuration information storage unit 18, and also attribute information stored in the attribute information storage unit 92, and displays the thus generated superposed image on the display unit 26.

The attribute information generation unit 90 of the three-dimensional CAD 12 can transmit attribute information to the attribute information storage unit 92 of the information presentation apparatus 10 online by the wireless or wire communication, or offline through a storage medium of some kind.

Furthermore, the attribute information management unit 96 of the information presentation apparatus 10 is provided with a function of reflecting the change of attribute information input by the keyboard 94 on three-dimensional design information stored in the three-dimensional design information storage unit 32 of the three-dimensional CAD 12, that is, original attribute information, similar to the case of reflecting the change of attribute information on attribute information stored in the attribute information storage unit 92. In this case, information may be transmitted from the attribute information management unit 96 to the three-dimensional design information storage unit 32 of the three-dimensional CAD 12 online or offline.

Fifth Embodiment

Figure 11:
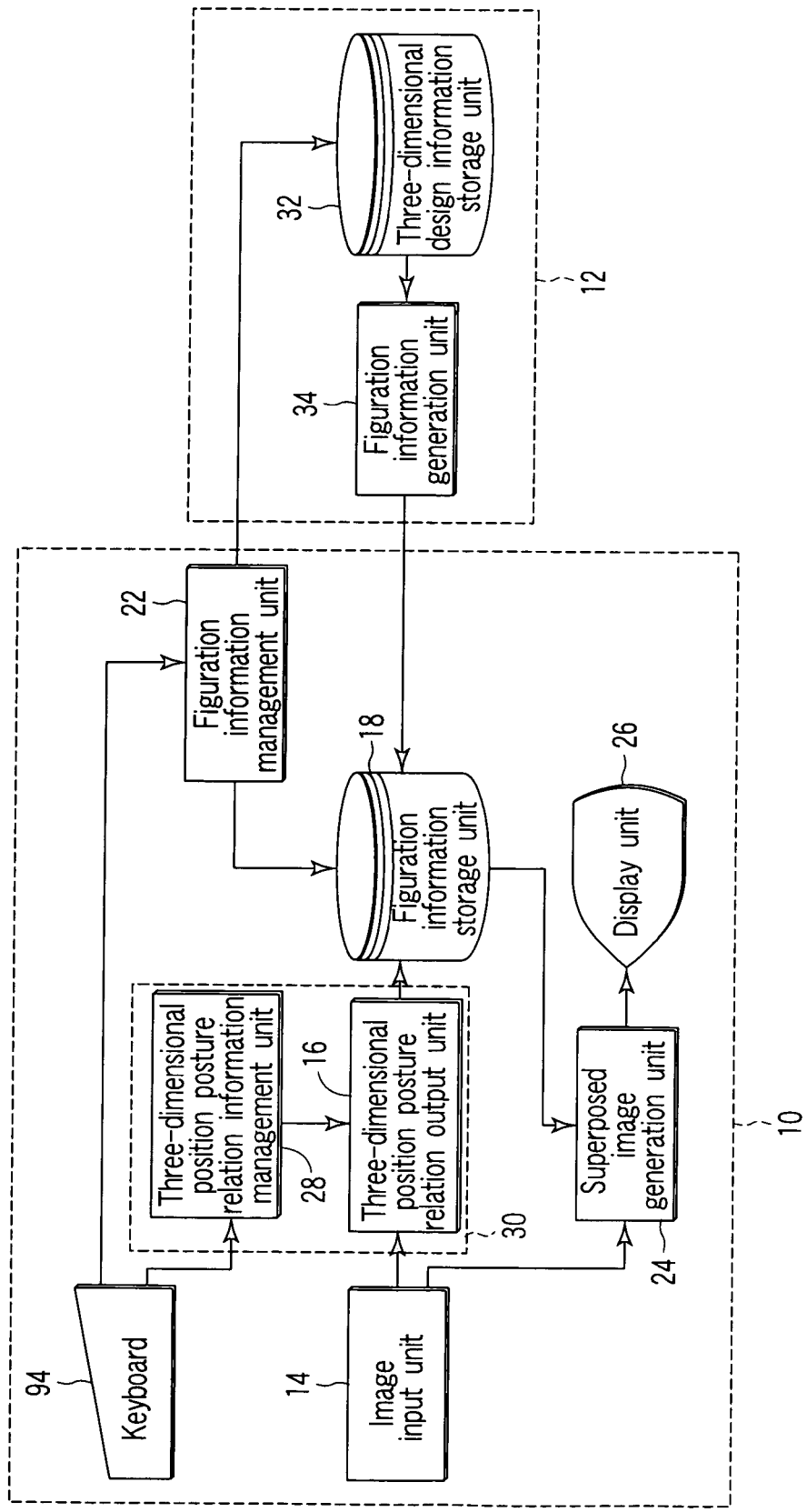
FIG. 11 shows a block diagram of an information presentation apparatus and an information presentation system using the same of the fifth embodiment according to the present invention.

An information presentation system of the fifth embodiment includes the keyboard 94 instead of the difference comparison detection unit 20 shown in FIG. 1, and directly supplies a shift amount of figuration information to the three-dimensional position posture relation information management unit 28 and figuration information management unit 22 as a value from the keyboard 94, as shown in FIG. 11.

That is, in above-described first to third embodiments, superposition deviation is automatically corrected by the difference comparison detection unit 20. On the other hand, in the fifth embodiment, a viewer takes a view of a superposed image to give an instruction to the three-dimensional position posture relation information management unit 28 and figuration information management unit 22 from, for example, the keyboard 94 such that a deviation between an image of a target object and a target object model formed using figuration information of the target object becomes minimum, thereby correcting the deviation.

Employing this configuration, effect similar to that obtained in the first to third embodiments can be obtained.

Figure 12:
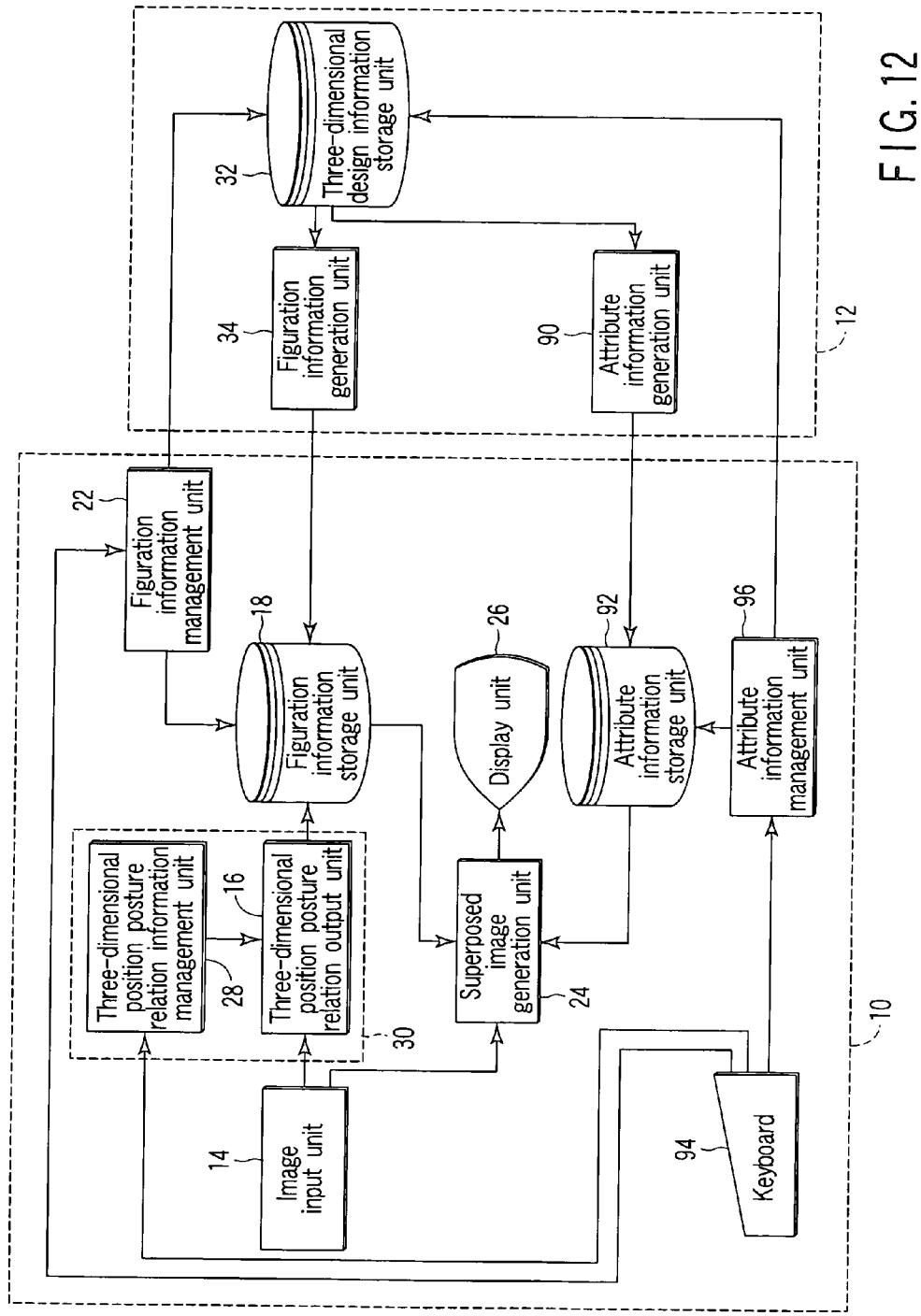
FIG. 12 shows a block diagram of an information presentation apparatus and an information presentation system using the same of a variation of the fifth embodiment.

Furthermore, similarly, instead of the difference comparison detection unit 20 shown in FIG. 10, the keyboard 94 may supply information to the three-dimensional position posture relation information management unit 28 and figuration information management unit 22, as shown in FIG. 12. In this configuration, effect similar to that obtained in the fourth embodiment can be obtained.

Sixth Embodiment

In the fifth embodiment, a viewer takes a view of a superposed image to give an instruction to the three-dimensional position posture relation information management unit 28 and figuration information management unit 22 from, for example, the keyboard 94 such that a deviation between an image of a target object and a target object model formed using figuration information of the target object becomes minimum, thereby correcting the deviation.

In the sixth embodiment, an instruction of not only the position and posture but also figuration change or part exchange is further given to the figuration information management unit 22.

The configuration of an information presentation system of the sixth embodiment is similar to that of the information presentation system of the fifth embodiment.

Figures 13A, 13B:
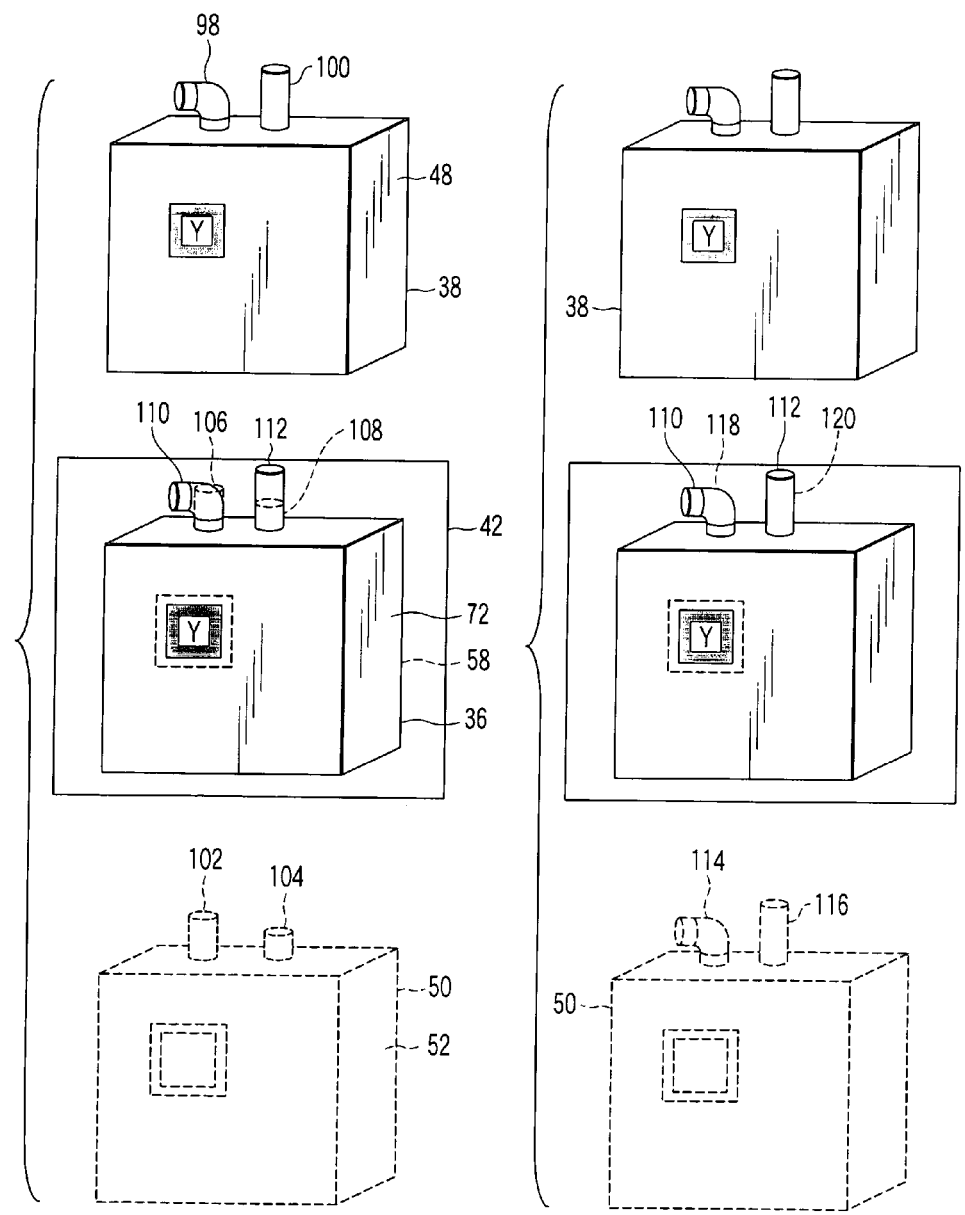
FIG. 13A shows a view of a target object and the display state thereof and figuration information of the target object before the processing to make a target object in the real space and design information (figuration information) coincide with each other is completed in an information presentation apparatus and an information presentation system using the same of the sixth embodiment according to the present invention.
FIG. 13B shows a view of a target object and the display state thereof and figuration information of the target object after the processing to make a target object in the real space and design information (figuration information) coincide with each other is completed.

In this information presentation system, for example, it is assumed that the image input unit 14 captures the main body 48 and parts 98, 100 attached thereto as the target object 38, as shown in FIG. 13A. In this case, the figuration information 50 of the target object 38 composed of the figuration information 52 of the main body 48, figuration information 102 of the part 98, and figuration information 104 of the part 100 is retrieved by the three-dimensional position posture relation detection unit 30. At this time, the superposed image generation unit 24 generates an image obtained by superposing the image 36 of the target object 38 and the target object model 40 (that is, the model 58 of the main body 48, a model 106 of the part 98, and a model 108 of the part 100) formed using the figuration information 50, and displays the thus generated image on the display unit 26.

In case there is a difference between the figuration of the actual part 98 and the figuration information 102 of the part 98, as shown in the same drawing, an image 110 of the part 98 and the model 106 thereof are displayed on the screen 42 of the display unit 26 with their positions deviated. Similarly, in case there is a difference between the figuration of the actual part 100 and the figuration information 104 of the part 100, an image 112 of the part 100 and the model 108 thereof are displayed on the screen 42 of the display unit 26 with their positions deviated.

That is, in an example shown in FIG. 13A, there are shown the figuration information 102 of a (long) straight pipe and the figuration information 104 of a (short) straight pipe according to design information. On the other hand, according to the target object in the real space, the part 98 is an elbow pipe and the part 100 is a (long) straight pipe, undesirably. Due to the difference, in a superposed image displayed on the screen 42 of the display unit 26, the images 110, 112 of the parts and the models 106, 108 are displayed with their positions deviated.

Accordingly, in this case, a viewer takes a view of a superposed image and inputs a value to express the figuration change of figuration information or a value to express the part exchange of figuration information for the figuration information management unit 22 from the keyboard 94. Accordingly, the figuration information management unit 22 exchanges the figuration information 102 of the (long) straight pipe for figuration information 114 of the elbow pipe, and changes the length of the figuration information 104 of the (short) straight pipe (into changed figuration information 116), as shown in FIG. 13B. Carrying out the processing, the real space and the target object information coincide with each other. That is, the deviation is cancelled when the figuration information 102 of the part 98 is changed into the figuration information 114 and the figuration information 104 of the part 100 is changed into the figuration information 116. Thus, the image 110 of the part 98 and a changed model 118 thereof, and the image 112 of the part 100 and a changed model 120 thereof are displayed on the screen 42 of the display unit 26 with their positions made to coincide with each other to be superposed.

While the invention has been described in accordance with certain preferred embodiments thereof in detail, it should be understood by those ordinarily skilled in the art that the invention is not limited to the embodiments, but various modifications, alternative constructions or equivalents can be implemented without departing from the scope and spirit of the present invention.

For example, in the first embodiment and/or the fourth embodiment, reflection by the figuration information management unit 22 and/or the attribute information management unit 96 to the three-dimensional design information storage unit 32 of the three-dimensional CAD 12 does not have to be carried out, as shown in FIG. 14 and FIG. 15.

Figure 16:
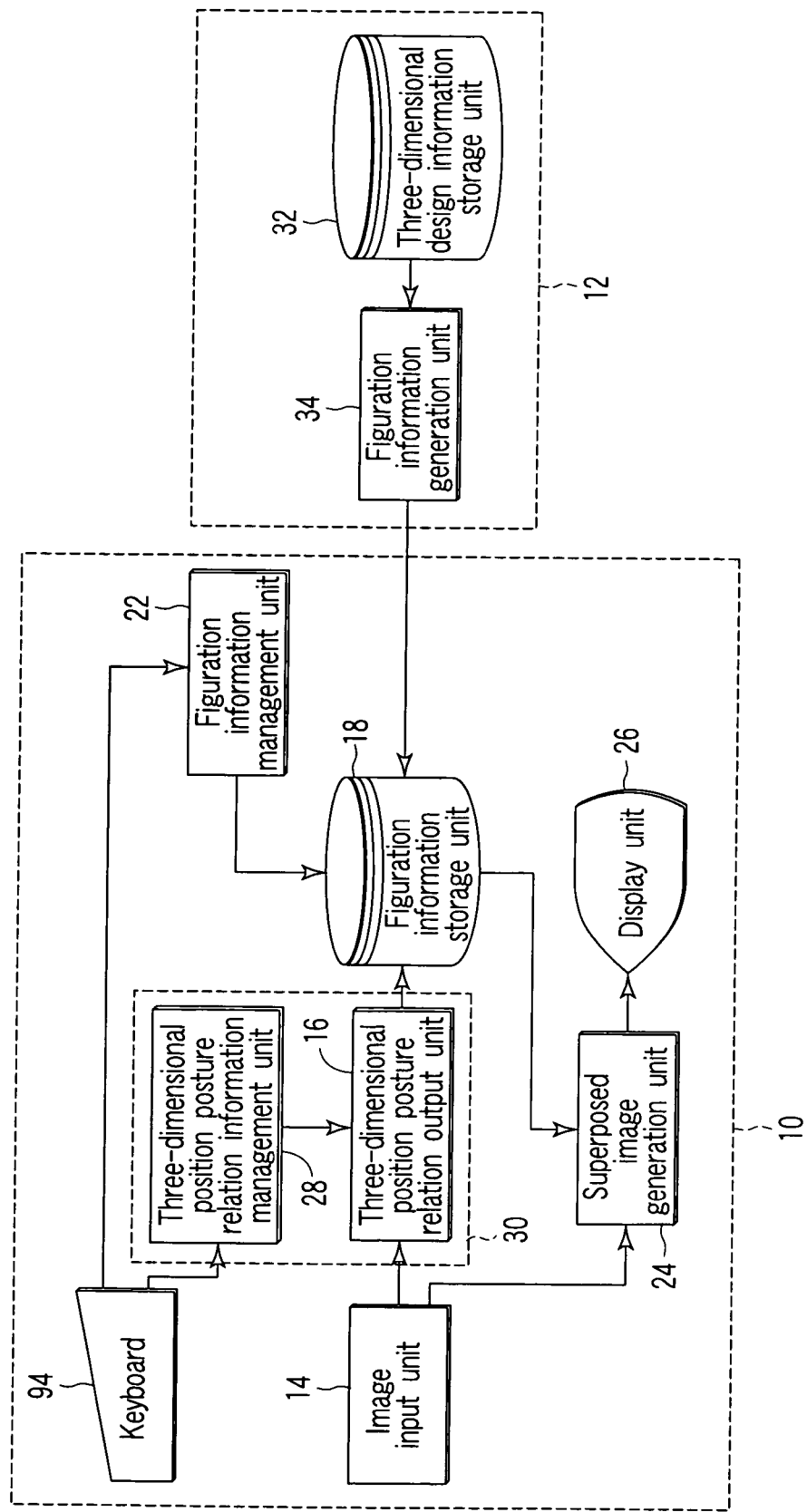
FIG. 16 shows a block diagram of an information presentation apparatus and an information presentation system using the same of a further variation of the variation shown in FIG. 14.
Figure 17:
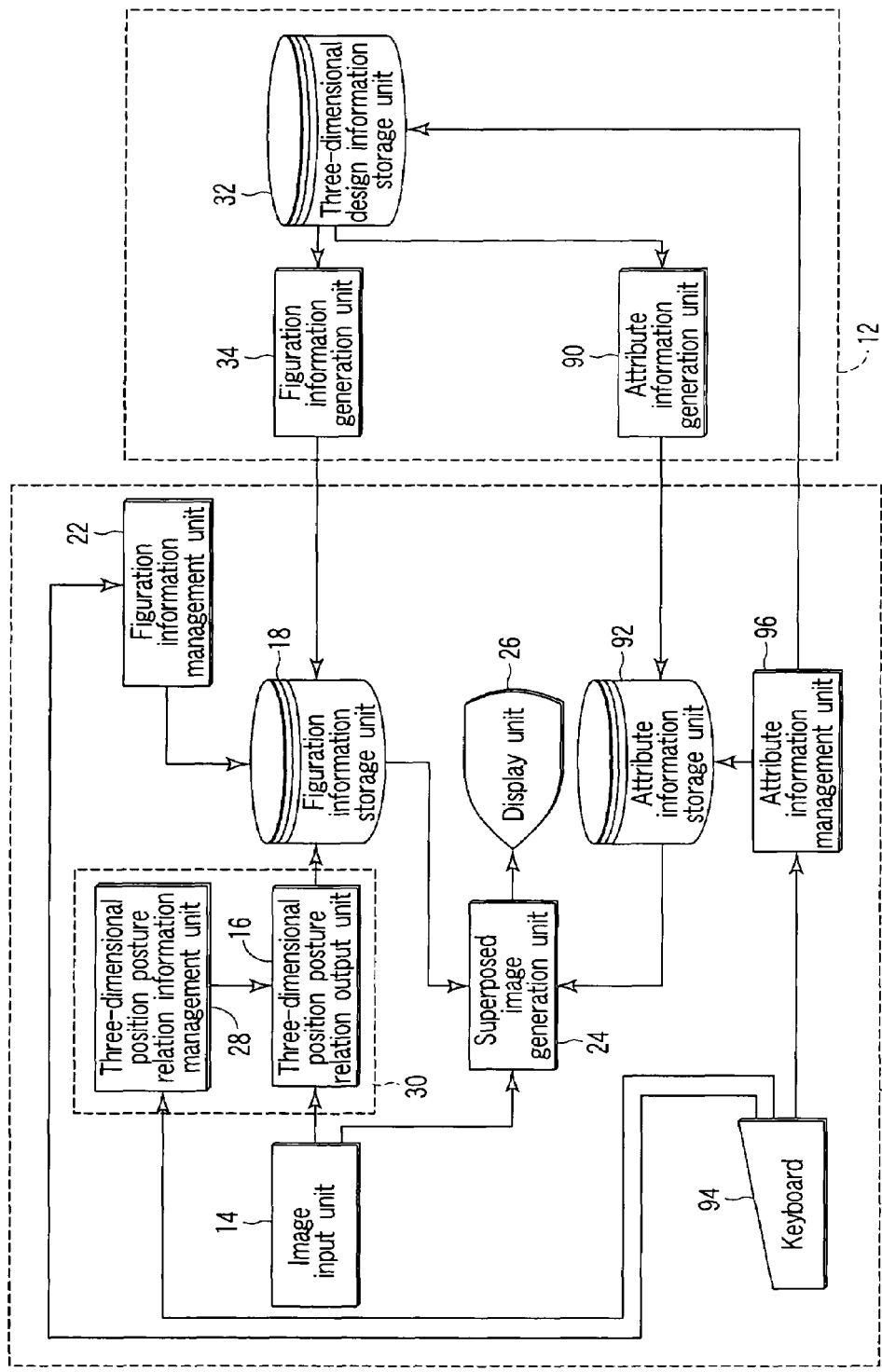
FIG. 17 shows a block diagram of an information presentation apparatus and an information presentation system using the same of a further variation of the variation shown in FIG. 15.

In this case, as is explained in the fifth embodiment, instead of the difference comparison detection unit 20, the keyboard 94 may supply information to the three-dimensional position posture relation information management unit 28 and figuration information management unit 22, as shown in FIG. 16 and FIG. 17.

The input unit is not restricted to the keyboard 94, and may be a mouse, a track ball, a touch panel, etc.

(Subjoinder)

According to above-described specific embodiments, other than the configuration written in the claims, the following configuration can be employed.

(1) An information presentation apparatus, comprising:

an image input unit configured to input an image of a target object arranged in a real space;

a three-dimensional position posture relation output unit configured to detect and output a relation of relative three-dimensional position and posture between the image input unit and the target object using the image of the target object input from the image input unit;

a figuration information storage unit configured to store figuration information of the target object;

an input unit;

a three-dimensional position posture information management unit configured to reflect a value input from the input unit on the relation of relative three-dimensional position and posture between the image input unit and the target object detected by the three-dimensional position posture relation output unit;

a superposed image generation unit configured to generate an image which is obtained by superposing the image of the target object input from the image input unit and figuration information of the target object stored in the figuration information storage unit; and a display unit configured to display the image generated by the superposed image generation unit.

(2) The information presentation apparatus as set forth in (1), wherein the value input from the input unit includes a shift amount of figuration information.

(3) The information presentation apparatus as set forth in (1) or (2), further comprising a figuration information management unit configured to reflect the value input from the input unit on figuration information stored in the figuration information storage unit.

(4) The information presentation apparatus as set forth in any one of (1) to (3), wherein the three-dimensional position posture information management unit uses a first shift amount of figuration information input from the input unit based on an image obtained by capturing the target object from a first direction, and a second shift amount of figuration information input from the input unit based on an image obtained by capturing the target object from a second direction different from the first direction.

(5) The information presentation apparatus as set forth in any one of (1) to (4), wherein the display unit displays a first image that is generated by the superposed image generation unit based on an image obtained by capturing the target object from a first direction, and a second image that is generated by the superposed image generation unit based on an image obtained by capturing the target object from a second direction different from the first direction.

(6) The information presentation apparatus as set forth in (1), wherein the value input from the input unit includes a value that depicts a figuration change of the figuration information.

(7) The information presentation apparatus as set forth in (1), wherein the value sent from the input unit includes a value that depicts a part change of the figuration information.

(8) The information presentation apparatus as set forth in (6) or (7), further comprising a figuration information management unit configured to reflect the value input from the input unit on figuration information stored in the figuration information storage unit.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information presentation apparatus, comprising:
   an image input unit configured to input an image of a target object in a real space;
   a three-dimensional position posture relation detection unit configured to detect a relation of relative three-dimensional position and posture between the image input unit and the target object using the image of the target object input from the image input unit;
   a figuration information storage unit configured to store figuration information of the target object;
   a difference comparison detection unit configured to compare the position and posture of the target object detected by the three-dimensional position posture relation detection unit and a value stored in the figuration information storage unit corresponding to a part of the target object input from the image input unit so as to detect a difference between an actual position and posture of the input target object and stored figuration information of the target object;
   a figuration information management unit configured to reflect a value of the difference from the difference comparison detection unit on figuration information stored in the figuration information storage unit;
   a superposed image generation unit configured to generate an image which is obtained by superposing the image of the target object input from the image input unit and figuration information of the target object stored in the figuration information storage unit; and
   a display unit configured to display the image generated by the superposed image generation unit.

2. The information presentation apparatus according to claim 1, wherein the difference detected by the difference comparison detection unit includes a shift amount of figuration information.

3. The information presentation apparatus according to claim 1, by further comprising an attribute information storage unit configured to store attribute information of the target object,
   wherein the superposed image generation unit is configured to superpose also attribute information stored in the attribute information storage unit.

4. The information presentation apparatus according to claim 3, further comprising:
   an input unit; and
   an attribute information management unit configured to reflect a change of attribute information input by the input unit on attribute information stored in the attribute information storage unit.

5. The information presentation apparatus according to claim 1, wherein the three-dimensional position posture relation detection unit includes:
   a three-dimensional position posture relation output unit configured to detect and output the relation of relative three-dimensional position and posture between the image input unit and the target object using an image of the target object input from the image input unit; and
   a three-dimensional position posture information management unit configured to reflect a value of the difference from the difference comparison detection unit on the relation of relative three-dimensional position and posture between the image input unit and the target object detected by the three-dimensional position posture relation output unit.

6. The information presentation apparatus according to claim 5, wherein the difference detected by the difference comparison detection unit includes a shift amount of figuration information.

7. The information presentation apparatus according to claim 5, further comprising a figuration information management unit configured to reflect a value of the difference from the difference comparison detection unit on figuration information stored in the figuration information storage unit.

8. The information presentation apparatus according to claim 5, wherein the three-dimensional position posture information management unit is configured to use a first difference value that is detected by the difference comparison detection unit based on an image obtained by capturing the target object from a first direction, and a second difference value that is detected by the difference comparison detection unit based on an image obtained by capturing the target object from a second direction different from the first direction.

9. The information presentation apparatus according to claim 5, wherein the display unit is configured to display a first image that is generated by the superposed image generation unit based on an image obtained by capturing the target object from a first direction, and a second image that is generated by the superposed image generation unit based on an image obtained by capturing the target object from a second direction different from the first direction.

10. An information presentation system, comprising:
    an information presentation apparatus including:
      an image input unit configured to input an image of a target object in a real space;
      a three-dimensional position posture relation detection unit configured to detect a relation of relative three-dimensional position and posture between the image input unit and the target object using the image of the target object input from the image input unit;
      a figuration information storage unit configured to store figuration information of the target object;
      a difference comparison detection unit configured to compare the position and posture of the target object detected by the three-dimensional position posture relation detection unit and a value stored in the figuration information storage unit corresponding to a part of the target object input from the image input unit so as to detect a difference between an actual position and posture of the input target object and stored figuration information of the target object;

a figuration information management unit configured to reflect a value of the difference from the difference comparison detection unit on figuration information stored in the figuration information storage unit;

a superposed image generation unit configured to generate an image which is obtained by superposing the image of the target object input from the image input unit and figuration information of the target object stored in the figuration information storage unit; and a display unit configured to display the image generated by the superposed image generation unit; and a three-dimensional CAD including:

a three-dimensional design information storage unit configured to store three-dimensional design information of the target object; and a figuration information generation unit configured to generate figuration information using three-dimensional design information stored in the three-dimensional design information storage unit, wherein the figuration information storage unit of the information presentation apparatus stores figuration information generated by the figuration information generation unit of the three-dimensional CAD.

11. The information presentation system according to claim 10, wherein the figuration information management unit of the information presentation apparatus is configured to reflect the value of the difference sent from the difference comparison detection unit on three-dimensional design information stored in the three-dimensional design information storage unit of the three-dimensional CAD.

12. The information presentation system according to claim 10, wherein the difference detected by the difference comparison detection unit of the information presentation apparatus includes a shift amount of figuration information.

13. The information presentation system according to claim 10, wherein the three-dimensional CAD further includes an attribute information generation unit configured to generate attribute information using three-dimensional design information of the target object, the information presentation apparatus further includes an attribute information storage unit configured to store attribute information generated by the attribute information generation unit of the three-dimensional CAD, and the superposed image generation unit of the information presentation apparatus is configured to also superpose attribute information stored in the attribute information storage unit.

14. The information presentation system according to claim 13, the information presentation apparatus further includes:

an input unit; and an attribute information management unit configured to reflect a change of attribute information input by the input unit on attribute information stored in the attribute information storage unit.

15. The information presentation system according to claim 14, wherein the attribute information management unit of the information presentation apparatus is configured to reflect the change of attribute information input by the input unit on three-dimensional design information stored in the three-dimensional design information storage unit of the three-dimensional CAD.

16. The information presentation system according to claim 10, wherein the three-dimensional position posture relation detection unit of the information presentation apparatus includes:

a three-dimensional position posture relation output unit configured to detect and output the relation of relative three-dimensional position and posture between the image input unit and the target object using the image of the target object input from the image input unit; and a three-dimensional position posture information management unit configured to reflect a value of the difference from the difference comparison detection unit on the relation of relative three-dimensional position and posture between the image input unit and the target object detected by the three-dimensional position posture relation output unit.

17. The information presentation system according to claim 16, wherein the difference detected by the difference comparison detection unit of the information presentation apparatus includes a shift amount of figuration information.

18. The information presentation system according to claim 16, wherein the information presentation apparatus further includes a figuration information management unit configured to reflect a value of the difference from the difference comparison detection unit on figuration information stored in the figuration information storage unit.

19. The information presentation system according to claim 16, wherein the three-dimensional position posture information management unit of the information presentation apparatus is configured to use a first difference value that is detected by the difference comparison detection unit based on an image obtained by capturing the target object from a first direction, and a second difference value that is detected by the difference comparison detection unit based on an image obtained by capturing the target object from a second direction different from the first direction.

20. The information presentation system according to claim 16, wherein the display unit of the information presentation apparatus is configured to display a first image that is generated by the superposed image generation unit based on an image obtained by capturing the target object from a first direction, and a second image that is generated by the superposed image generation unit based on an image obtained by capturing the target object from a second direction different from the first direction.

21. An information presentation apparatus, comprising:

image input means for inputting an image of a target object in a real space;

three-dimensional position posture relation detection means for detecting a relation of relative three-dimensional position and posture between the image input means and the target object using the image of the target object input from the image input means;

figuration information storage means for storing figuration information of the target object;

difference comparison detection means for comparing the position and posture of the target object detected by the three-dimensional position posture relation detection means and a value stored in the figuration information storage means corresponding to a part of the target object input from the image input means so as to detect a difference between an actual position and posture of the input target object and stored figuration information of the target object;

figuration information management means for reflecting a value of the difference from the difference comparison detection means on figuration information stored in the figuration information storage means;

superposed image generation means for generating an image which is obtained by superposing the image of the target object input from the image input means and figuration information of the target object stored in the figuration information storage means; and display means for displaying the image generated by the superposed image generation means.

22. An information presentation system, comprising:

an information presentation apparatus including:

image input means for inputting an image of a target object in a real space;

three-dimensional position posture relation detection means for detecting a relation of relative three-dimensional position and posture between the image input means and the target object using the image of the target object input from the image input means;

figuration information storage means for storing figuration information of the target object;

difference comparison detection means for comparing the position and posture of the target object detected by the three-dimensional position posture relation detection means and a value stored in the figuration information storage means corresponding to a part of the target object input from the image input means so as to detect a difference between an actual position and posture of the input target object and stored figuration information of the target object;

figuration information management means for reflecting a value of the difference from the difference comparison detection means on figuration information stored in the figuration information storage means;

superposed image generation means for generating an image which is obtained by superposing the image of the target object input from the image input means and figuration information of the target object stored in the figuration information storage means; and display means for displaying the image generated by the superposed image generation means; and a three-dimensional CAD including:

three-dimensional design information storage means for storing three-dimensional design information of the target object; and figuration information generation means for generating figuration information using three-dimensional design information stored in the three-dimensional design information storage means, wherein the figuration information storage means of the information presentation apparatus stores figuration information generated by the figuration information generation means of the three-dimensional CAD.

\* \* \* \* \*